US011340389B2

(12) United States Patent
Toyama

(10) Patent No.: US 11,340,389 B2
(45) Date of Patent: May 24, 2022

(54) DIFFRACTIVE OPTICAL ELEMENT

(71) Applicant: DAI NIPPON PRINTING CO., LTD., Tokyo (JP)

(72) Inventor: Nobuhito Toyama, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 153 days.

(21) Appl. No.: 16/492,981

(22) PCT Filed: Mar. 20, 2018

(86) PCT No.: PCT/JP2018/011027
§ 371 (c)(1),
(2) Date: Sep. 11, 2019

(87) PCT Pub. No.: WO2018/174057
PCT Pub. Date: Sep. 27, 2018

(65) Prior Publication Data
US 2020/0073030 A1    Mar. 5, 2020

(30) Foreign Application Priority Data

Mar. 23, 2017 (JP) .............................. JP2017-058164
Mar. 19, 2018 (JP) .............................. JP2018-051019

(51) Int. Cl.
*G02B 5/18* (2006.01)
(52) U.S. Cl.
CPC .................................. *G02B 5/1819* (2013.01)
(58) Field of Classification Search
CPC ... G02B 5/1819; B42D 25/324; B42D 25/328
See application file for complete search history.

(56) References Cited

U.S. PATENT DOCUMENTS

| 2008/0247167 A1 | 10/2008 | Matsubara et al. |
| 2012/0162771 A1* | 6/2012 | Walter ................ G02B 5/1809 |
| | | 359/569 |
| 2015/0252980 A1 | 9/2015 | Maeda et al. |

FOREIGN PATENT DOCUMENTS

| EP | 2919157 A1 | 9/2015 |
| JP | 2002-55217 A | 2/2002 |

(Continued)

OTHER PUBLICATIONS

Jun. 12, 2018 International Search Report issued in International Patent Application No. PCT/JP2018/011027.

(Continued)

*Primary Examiner* — Kimberly N. Kakalec
(74) *Attorney, Agent, or Firm* — Oliff PLC

(57) ABSTRACT

A diffractive optical element, in which a diffraction grating having a large pitch and a multitude of diffraction gratings can be arranged, includes a plurality of cells arranged side by side, wherein, for each cell, the pitch at which projections are lined up and/or the orientation of an in-plane rotation direction are/is different, and, within a single cell, the projections' pitch and the in-plane rotation direction orientation are the same, the diffractive optical element shaping light by this configuration which is an assembly of these cells. The plurality of cells include: a plurality of basic cells having the same outer shape; and a composite cell having a different outer shape from the basic cells, formed such that the length thereof in a specific direction is longer than the length of the basic cell, the composite cell having a diffraction grating including at least a single pitch's worth of the projection(s).

6 Claims, 21 Drawing Sheets

(56) References Cited

FOREIGN PATENT DOCUMENTS

JP     2008-256822 A     10/2008
JP     2015-170320 A     9/2015

OTHER PUBLICATIONS

Daniel Asoubar et al. "Customized Homogenization and Shaping of LED Light by Micro Cells Arrays". Mar. 9, 2015.
Apr. 2, 2021 Office Action issued in Chinese Patent Application No. 201880015085.7.

* cited by examiner

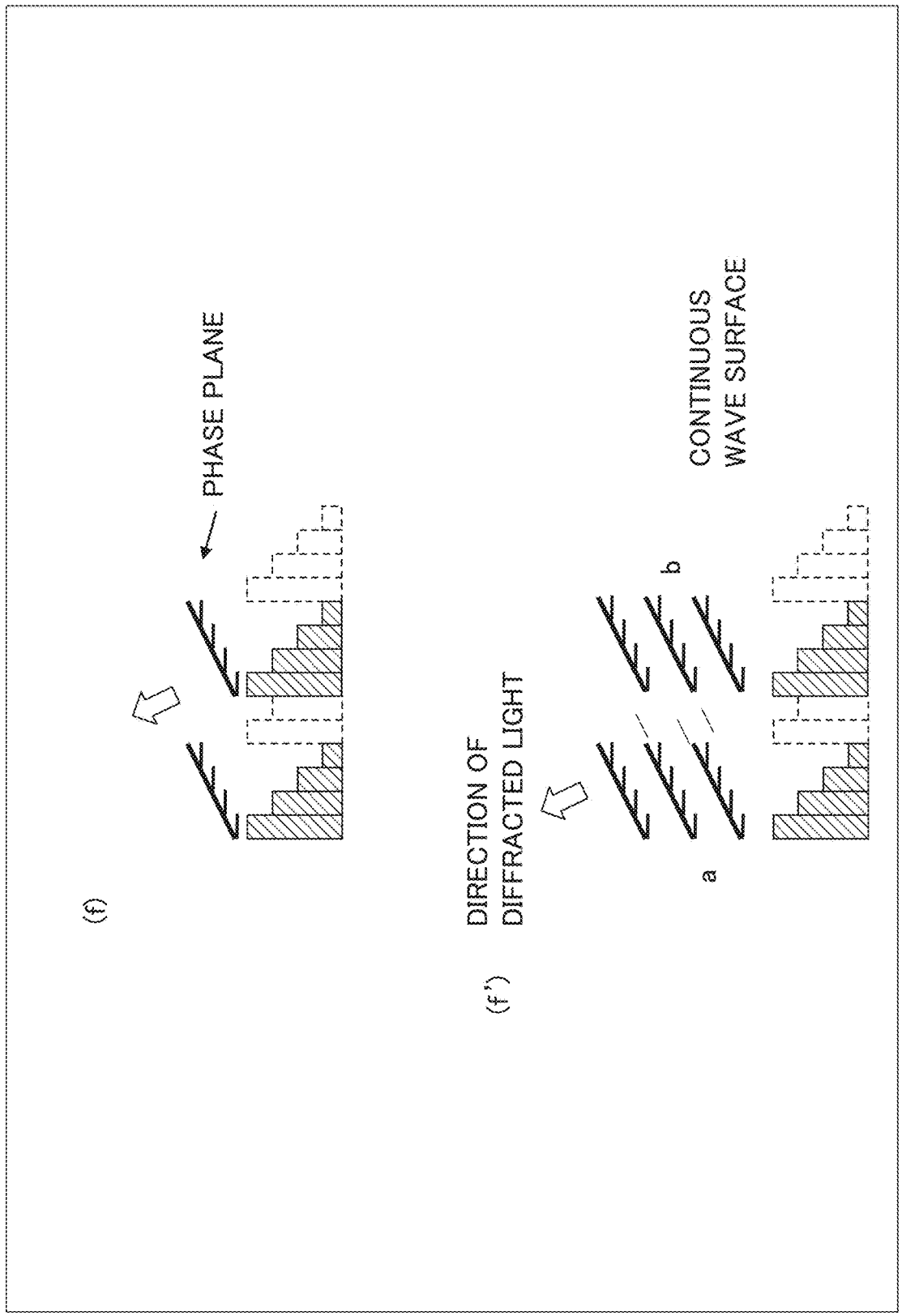

DIFFRACTIVE OPTICAL ELEMENT

TECHNICAL FIELD

The present invention relates to a diffractive optical element.

BACKGROUND ART

In recent years, with the spread of networks, because of the need for personal identification to avoid security risks, the trend of automated driving of cars, and the spread of the so-called "Internet of Things", the need for sensor systems has increased. There are various types of sensors, and types of information to be detected are various. In one of the means, an object is irradiated with light emitted from a light source, and information is obtained from reflected light. For example, a pattern authentication sensor, an infrared radar, or the like is an example.

As the light sources of these sensors, light sources having wavelength distribution, brightness, and spread according to the application are used. The wavelength of visible light to infrared light is often used as the light wavelength. In particular, since infrared light is not easily affected by external light, is invisible, and can be used to observe the interior of an object, the infrared light is widely used. In addition, as a type of light source, an LED light source, a laser light source, and the like are often used. For example, a laser light source with small spread of light is suitably used to detect a distant place, and an LED light source is suitably used to detect a relatively close place or to illuminate an area having a certain extent of spread.

By the way, the size and shape of the target irradiation area do not necessarily coincide with the spread (profile) of the light from the light source. In that case, the light needs to be shaped by a diffusion plate, a lens, a shielding plate, or the like. Recently, a diffusion plate called a light shaping diffuser (LSD) has been developed that can shape the shape of light to some extent. In addition, as another means of shaping light, a diffractive optical element (DOE) can be exemplified. This is an application of the diffraction phenomenon when light passes through a location where materials having different refractive indexes are arranged with periodicity. The DOE is basically designed for light having a single wavelength, but theoretically, it is possible to shape the light into an almost arbitrary shape. In addition, in the LSD described above, the light intensity in the irradiation area has a Gaussian distribution, whereas in the DOE, it is possible to control the uniformity of the light distribution in the irradiation area. Such characteristics of the DOE have advantages in terms of high efficiency by suppressing irradiation on unnecessary regions, miniaturizing the device by reduction of the number of light sources, and the like (refer to, for example, Patent Document 1). In addition, the DOE is compatible with both parallel light sources such as lasers and diffused light sources such as LEDs and is applicable to a wide range of wavelengths from ultraviolet light to visible light and infrared light.

A form referred to as a grating cell array has been conventionally used as a form of the diffractive optical element (see Patent Document 1 and Non-Patent Document 1). In the grating cell array type diffractive optical element, for example, square fine unit regions (cells) are arranged in a matrix. Further, in one unit region of the grating cell array type diffractive optical element, a diffraction grating, in-plane rotation direction of which is oriented in a certain direction, is arranged at a fixed pitch. In addition, in the grating cell array type diffractive optical element, the pitch and the rotation direction of the arranged diffraction grating are different for each unit region, and one diffractive optical element is configured as an assembly thereof. For example, a size of this unit region is about 20 μm×20 μm.

In the diffraction grating, the smaller a diffraction angle, the larger an arrangement pitch of a concavo-convex shape. However, since the unit region of the grating cell array is fine, a pitch of diffraction grating having a small diffraction angle may exceed a size of one unit region. In this case, the diffraction grating to be arranged in the unit region may not function as a diffraction grating, and there is a concern that a decrease in diffraction efficiency etc. may occur. To allow a diffraction grating having a large pitch to function sufficiently, it is conceivable to increase the size of the unit region. However, when the size of the unit region is increased, the number of unit regions that can be arranged per unit area, that is, the number of diffraction gratings allowed to be arranged decreases. In that case, there is a concern that a compact diffractive optical element may not be practically configured.

Patent Document 1: Japanese Unexamined Patent Application, Publication No. 2015-170320

Non-Patent Document 1: Daniel Asoubar, et al. "Customized homogenization and shaping of LED light by micro cells arrays" 9 Mar. 2015

DISCLOSURE OF THE INVENTION

Problems to be Solved by the Invention

An object of the invention is to provide a diffractive optical element in which a diffraction grating having a large pitch can be arranged, and in which a multitude of diffraction gratings can be arranged.

Means for Solving the Problems

The invention solves the above-mentioned problems by the following solution means. To facilitate understanding, a description will be given by attaching reference symbols corresponding to the embodiments of the invention. However, the invention is not limited thereto.

A first invention is a diffractive optical element (10) including a diffraction layer (15), the diffraction layer including a high refractive index part (11) in which a plurality of projections (11a) is arranged side by side in a cross-sectional shape, and a low refractive index part (14) that has a lower refractive index than a refractive index of the high refractive index part (11) and includes at least a recess (12) formed between the projections (11a), a plurality of cells being arranged side by side, at least one of a pitch at which the projections (11a) are arranged and arrangement in an in-plane rotation direction being different for each cell, the pitch of the projections (11a) and the arrangement in the in-plane rotation direction being the same in the same cell, light being shaped by a configuration as an assembly of the cells, in which the plurality of cells includes a plurality of basic cells (10a) having the same outer shapes of the cells, and a composite cell (10b) corresponding to a cell having a different outer shape from an outer shape of the basic cells (10a) and having a diffraction grating that has a length in a specific direction longer than a length of the basic cells (10a) and includes at least one pitch of the projections (11a), or a cell having a diffraction grating that has the same pitch of the projections (11a) and arrangement in the in-plane rotation direction and includes one pitch of the projections (11a) by a plurality of cells arranged side by side at an interval.

A second invention is the diffractive optical element (10) according to the first invention characterized in that the composite cell (10b) has a shape obtained by combining a specific number of basic cells (10a) and dividing the combined basic cells (10a) into the specific number of parts.

A third invention is the diffractive optical element (10) according to the second invention characterized in that a direction in which the composite cell (10b) is divided is a direction intersecting the specific direction or a direction intersecting a direction in which a plurality of composite cells (10b) is arranged side by side at an interval.

A fourth invention is the diffractive optical element (10) according to any one of the first invention to the third invention characterized in that a pitch of the projections (11a) of the diffraction grating included in the composite cell (10b) is larger than a pitch of projections (11a) of a diffraction grating included in the basic cells (10a).

A fifth invention is the diffractive optical element (10) according to the fourth invention characterized in that the pitch of the projections (11a) of the diffraction grating included in the composite cell (10b) is larger than a maximum length of the outer shapes of the basic cells (10a).

Effects of the Invention

According to the invention, it is possible to provide a diffractive optical element in which a diffraction grating having a large pitch can be arranged, and in which a multitude of diffraction gratings can be arranged.

BRIEF DESCRIPTION OF THE DRAWINGS

FIGS. 19A to 19C are diagrams for description of a diffraction phenomenon by a 4-level diffraction grating.

PREFERRED MODE FOR CARRYING OUT THE INVENTION

Hereinafter, a best mode for carrying out the invention will be described with reference to drawings etc.

First Embodiment

Figure 1:
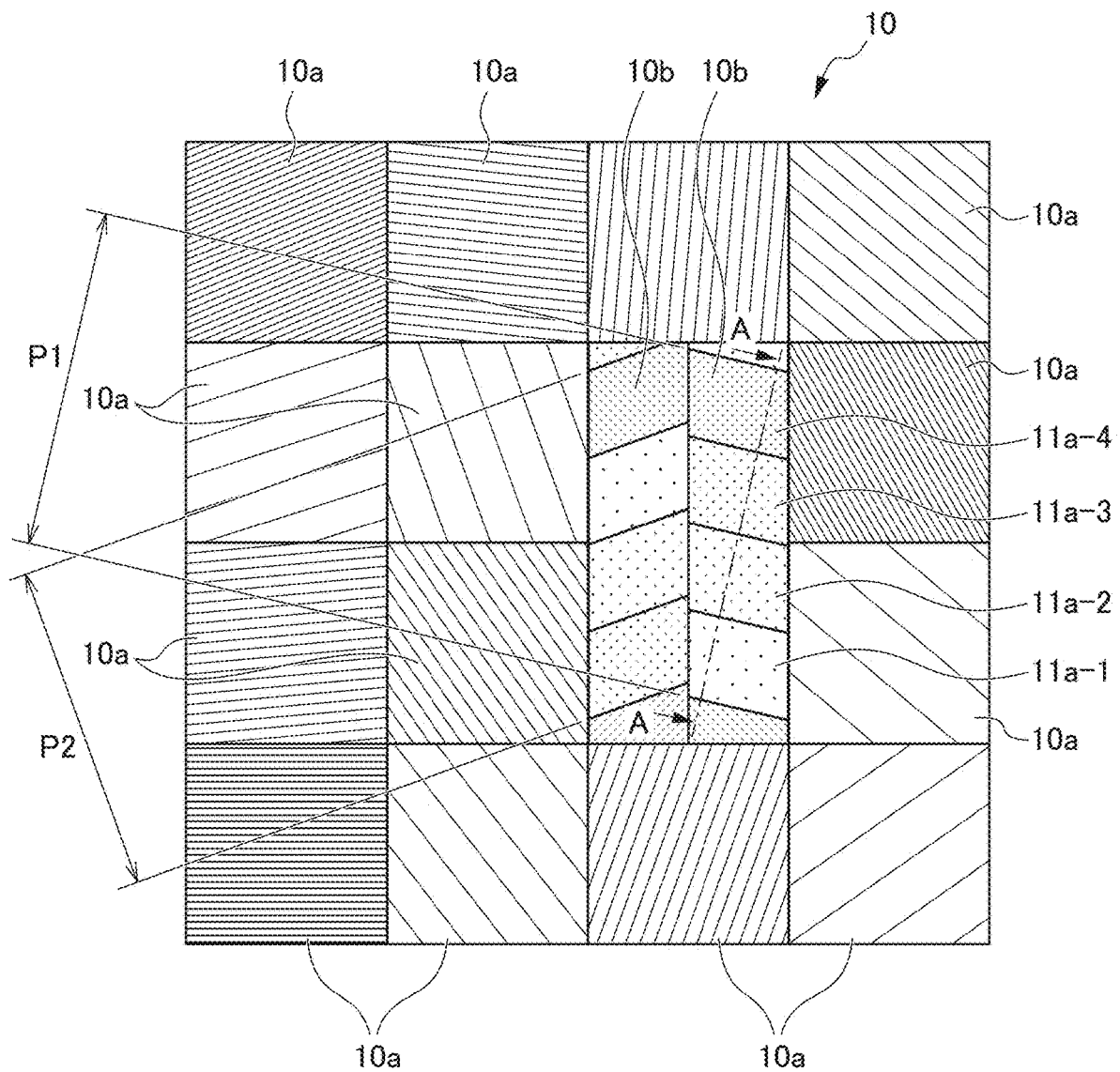
FIG. 1 is a plan view illustrating a first embodiment of a diffractive optical element according to the invention.
Figure 2:
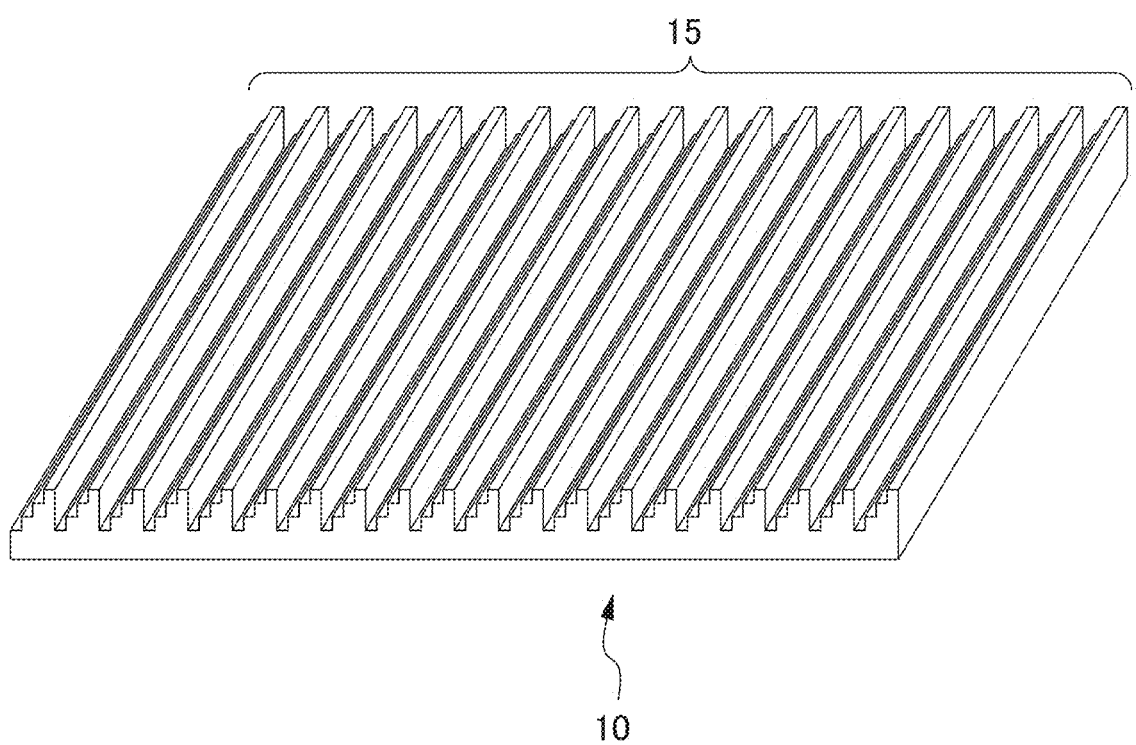
FIG. 2 is a perspective view illustrating an example of a partial periodic structure in an example of the diffractive optical element of FIG. 1.
Figure 3:
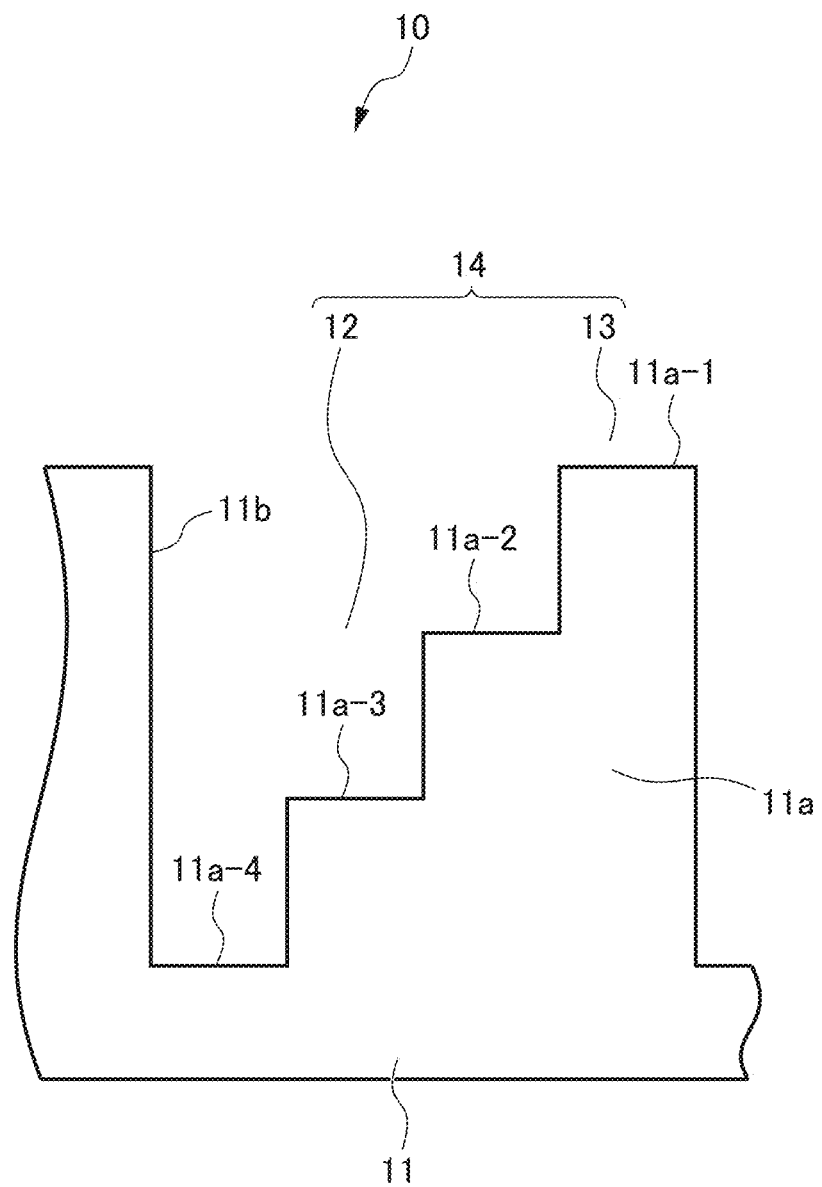
FIG. 3 is a cross-sectional view in which the diffractive optical element is cut at a position of an arrow A-A in FIG. 1.
Figure 4:
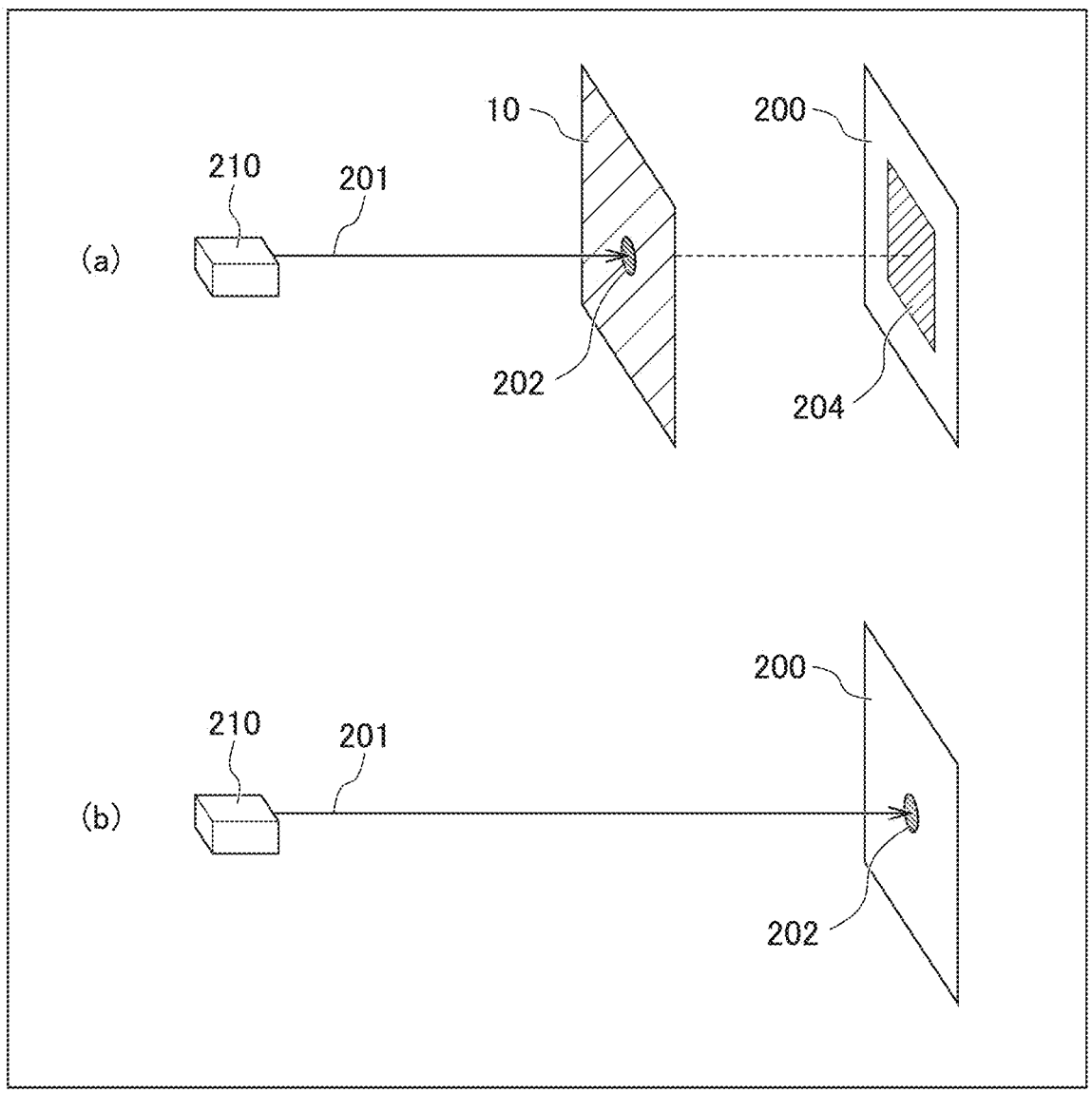
FIG. 4 is diagram for description of the diffractive optical element.

FIG. 1 is a plan view illustrating a first embodiment of a diffractive optical element according to the invention. FIG. 2 is a perspective view illustrating an example of a partial periodic structure in an example of the diffractive optical element of FIG. 1. FIG. 3 is a cross-sectional view in which the diffractive optical element is cut at a position of an arrow A-A in FIG. 1. FIG. 4 is a diagram for description of the diffractive optical element. Respective figures illustrated below including FIG. 1 are schematically illustrated figures, and a size and a shape of each part are suitably exaggerated to facilitate understanding. In addition, in description below, a specific numerical value, shape, material, etc. are shown and demonstrated, which may be suitably changed.

Terms used to specify a shape or a geometrical condition and a degree thereof in the invention, for example, terms such as "parallel", "orthogonal", "identical", values of length, angle, etc. are interpreted including a range of the extent to which the same function can be expected without being bound by the meaning.

In addition, in the invention, "shaping light" means that a shape (irradiation region) of light projected onto an object or a target region is set to an arbitrary shape by controlling a traveling direction of light. For example, as illustrated in an example of FIG. 4, a light source unit 210 is prepared to emit light 201 (FIG. 4(b)) forming a circular irradiation region 202 when projected directly onto a planar screen 200. "Shaping light" is forming an irradiation region 204 into a target shape such as a square (FIG. 4(a)), a rectangle, a circle (not illustrated), etc. by transmitting the light 201 through a diffractive optical element 10 of the invention. It is possible to obtain a light irradiation device capable of emitting light in a state where light is formed by combining the light source unit 210 and at least one diffractive optical element 10 of the present embodiment disposed at a position through which light emitted from the light source unit 210 passes. In addition, in the invention, a term "transparent" refers to one that transmits light of at least a wavelength used. For example, it is presumed that one is treated as transparent when used for infrared applications if the one transmits infrared light even when the one does not transmit visible light.

The diffractive optical element 10 of the first embodiment is a diffractive optical element (DOE) that shapes light. For example, the diffractive optical element 10 is designed to spread light in a cross shape, specifically, for example, a shape of two light bands having a width of ±3.3 degrees at a tolerance of ±50 degrees for light from the light source unit 210 that emits light having a wavelength of 550 nm. The diffractive optical element 10 according to the first embodiment is formed of multistep shapes having four steps of different heights. Further, the diffractive optical element 10 is a grating cell array type diffractive optical element in which a plurality of unit regions (also referred to as cells or partial periodic structures) having different periodic structures are arranged in a matrix. In FIG. 2, an example of the partial periodic structure is extracted and illustrated.

As illustrated in FIG. 3, the diffractive optical element 10 includes a high refractive index part 11 in which a plurality of projections 11a are arranged side by side in a cross-sectional shape. The high refractive index part 11 extends in a depth direction of a cross section while maintaining the same cross-sectional shape.

For example, the high refractive index part 11 is made by processing a shape of quartz ($SiO_2$, synthetic quartz) through an etching process. In addition, the high refractive index part 11 may be configured by performing mold making from processed quartz to create a mold and curing an ionizing radiation curable resin composition using this mold. Various schemes are known as a method of producing an article having such a periodic structure using the ionizing radiation curable resin composition, and the high refractive index part 11 of the diffractive optical element 10 can be appropriately produced by utilizing these known schemes.

In addition, air is present in an upper portion of FIG. 3 including a recess 12 formed between projections 11a and a space 13 near a top of a projection 11a, and the portion corresponds to a low refractive index part 14 having a lower refractive index than that of the high refractive index part 11. A diffraction layer 15 having an action of shaping light is configured by a periodic structure in which the high refractive index part 11 and the low refractive index part 14 are alternately arranged.

The projection 11a has a multistep shape including four step portions having different heights on one side (left side in FIG. 3) of a side surface shape. Specifically, the projection 11a has a level 1 step portion 11a-1 that protrudes the most, a level 2 step portion 11a-2 which is one step lower than the level 1 step portion 11a-1, a level 3 step portion 11a-3 which is one step lower than the level 2 step portion 11a-2, and a level 4 step portion 11a-4 which is one step lower than the level 3 step portion 11a-3 on one side. In addition, the other side (right side in FIG. 3) of the side surface shape of the projection 11a corresponds to a sidewall portion 11b linearly connected from the level 1 step portion 11a-1 to the level 4 step portion 11a-4.

As illustrated in FIG. 1, in the diffractive optical element 10, a plurality of basic cells 10a and a composite cell 10b are arranged in a matrix as fine unit regions (cells). In the present embodiment, each of the basic cells 10a is formed in a square shape, and a plurality of the basic cells 10a are arranged side by side.

The composite cell 10b is a cell having an outer shape different from that of the basic cell 10a, and is configured in a rectangular shape in the present embodiment. In addition, the composite cell 10b is formed such that a length in a specific direction (vertical direction in FIG. 1) is longer than a length of the basic cell 10a, and is a cell having a diffraction grating including one pitch of the projections 11a. Two composite cells 10b are arranged in FIG. 1. In the present embodiment, the composite cells 10b have a shape in which obtained by combining two basic cells 10a, as a specific number, and dividing the two combined basic cells 10a are divided into two parts, as the specific number. That is, the composite cells 10b have a rectangular shape in which two square basic cells 10a are arranged and combined in the vertical direction in the figure and divided into two parts in a left-right direction in the figure. In the present embodiment, a dividing direction corresponds to the left-right direction intersecting (orthogonal to) the vertical direction as the specific direction in which the length of the composite cells 10b is longer than the length of the basic cell 10a. The diffractive optical element 10 of the present embodiment has a conventional grating cell array as a basic form and has a form different from the conventional grating cell array in that the composite cell 10b is arranged therein.

In FIG. 1, a difference in height of each step portion is shown by a difference in dot pattern only for the composite cell 10b. Therefore, P1 and P2 of FIG. 1 represent one pitch in each diffraction grating. On the other hand, the other basic cells 10a have similar four-step height differences. However, since narrow pitch portions are present, these portions are simply represented by diagonal lines, and four interval portions between straight lines represent one pitch.

As illustrated in FIG. 1, the pitches P1 and P2 of the projections 11a of the diffraction gratings included in the composite cells 10b are larger than a pitch of the projections 11a of the diffraction gratings included in the basic cell 10a. In addition, the pitches P1 and P2 of the projections 11a of the diffraction gratings formed by the composite cell 10b are larger than a maximum length of the outer shape of the basic cell 10a. Therefore, when a diffraction grating included in the composite cell 10b is attempted to be arranged without change on the basic cell 10a according to the conventional grating cell array design scheme, it is impossible to arrange the pitches P1 and P2 of the projections 11a in one basic cell 10a. However, in the diffractive optical element 10 of the present embodiment, since the length in the specific direction (vertical direction in FIG. 1) of the composite cell 10b is long, the diffraction gratings having large pitches P1 and P2 can be disposed within this range. Hereinafter, arrangement of the diffraction grating and a configuration scheme of the composite cell 10b will be more specifically described.

Figure 5:
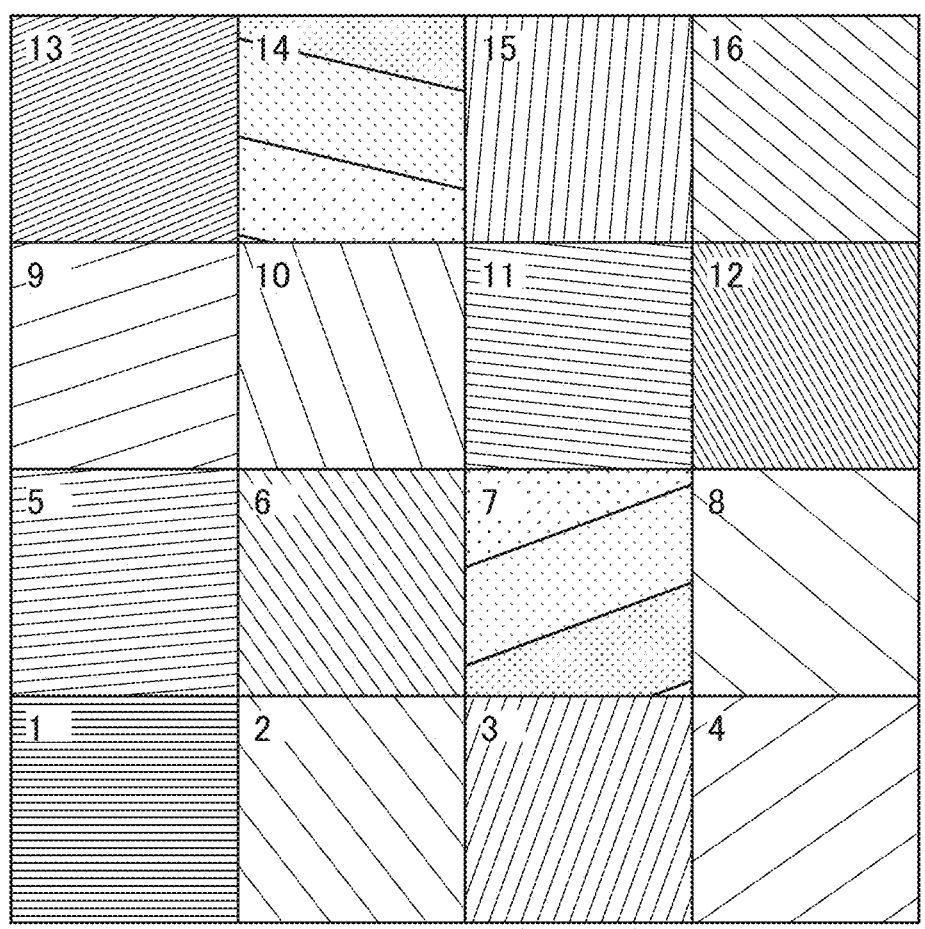
FIG. 5 is a diagram illustrating an example of arrangement of diffraction gratings in the case of designing a diffractive optical element 10 having a similar light distribution characteristic to that of the diffractive optical element 10 of the present embodiment according to a conventional grating cell array design scheme.

FIG. 5 is a diagram illustrating an example of arrangement of diffraction gratings in the case of designing a diffractive optical element 10 having a similar light distribution characteristic to that of the diffractive optical element 10 of the present embodiment according to the conventional grating cell array design scheme. A design illustrated in FIG. 5 has been conventionally designed semi-automatically by a program. In FIG. 5, for convenience of description, numbers 1 to 16 are added to respective cells. Here, for simplicity, a description is given using 4×4=16 cells. However, normally, the larger numbers of rows and columns are included. For example, a 4 mm square diffractive optical element 10 is configured by 200×200=40,000 cells. In FIG. 5, cell numbers 7 and 14 contain only about 2 to 3 steps. In the 4-level diffraction grating of the present embodiment, one pitch is formed by four steps. Thus, in a state of FIG. 5, a diffraction grating for one pitch is not included in cell numbers 7 and 14. In a state where the diffraction grating arranged in this manner corresponds to less than one pitch, the corresponding cell may not function as a diffraction grating. In this case, such a region (cell) is not only a substantially useless region, but also hinders light emitted in a direction, for which the cell is originally responsible, from being correctly emitted, which conventionally results in reduction in diffraction efficiency.

A cell of cell number 7 or 14 in FIG. 5, that is, a cell that may not include one pitch of the projection 11a is subjected to a process of converting the cell into the composite cell 10b described above. Note that this conversion process can be automated or semi-automated by a design program. In addition, a designer may manually perform a conversion process below. The same result is obtained by either conversion process as long as the composite cell 10b illustrated in FIG. 1 can be configured. First, after basic design illustrated in FIG. 5 is performed by the conventional grating cell array design scheme, cell movement (place exchange) processing is performed.

Figure 6:
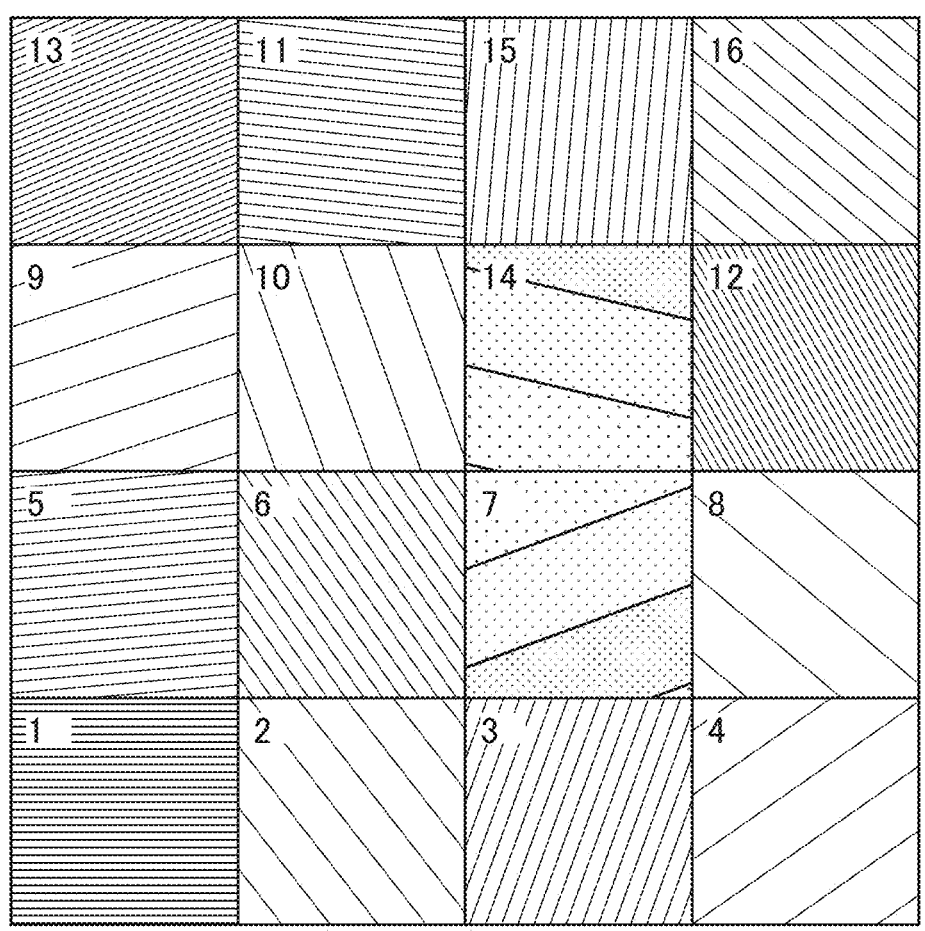
FIG. 6 is a diagram illustrating an example of a result of moving a cell from a state of FIG. 5.

FIG. 6 is a diagram illustrating an example of a result of moving a cell from a state of FIG. 5. In this example, places of cell number 11 and cell number 14 are exchanged to rearrange cell number 11 and cell number 14. Here, an aim of the place exchange is to arrange cells including a diffraction grating not including one pitch, that is, being so large that a length of one pitch does not fit in the basic cell 10a (here, cells of cell numbers 7 and 14) side by side, and arrange the cells such that the cells have a length exceeding the length of one pitch when the cells are connected. Here, the cells arranged side by side (cells of cell numbers 7 and 14) need to be arranged in a direction closest to a direction in which the projections 11a of the diffraction gratings in these cells are arranged. When this condition is satisfied, an arrangement position is not limited to the example of FIG. 6. For example, cell number 14 may be arranged under cell number 7.

Figure 7:
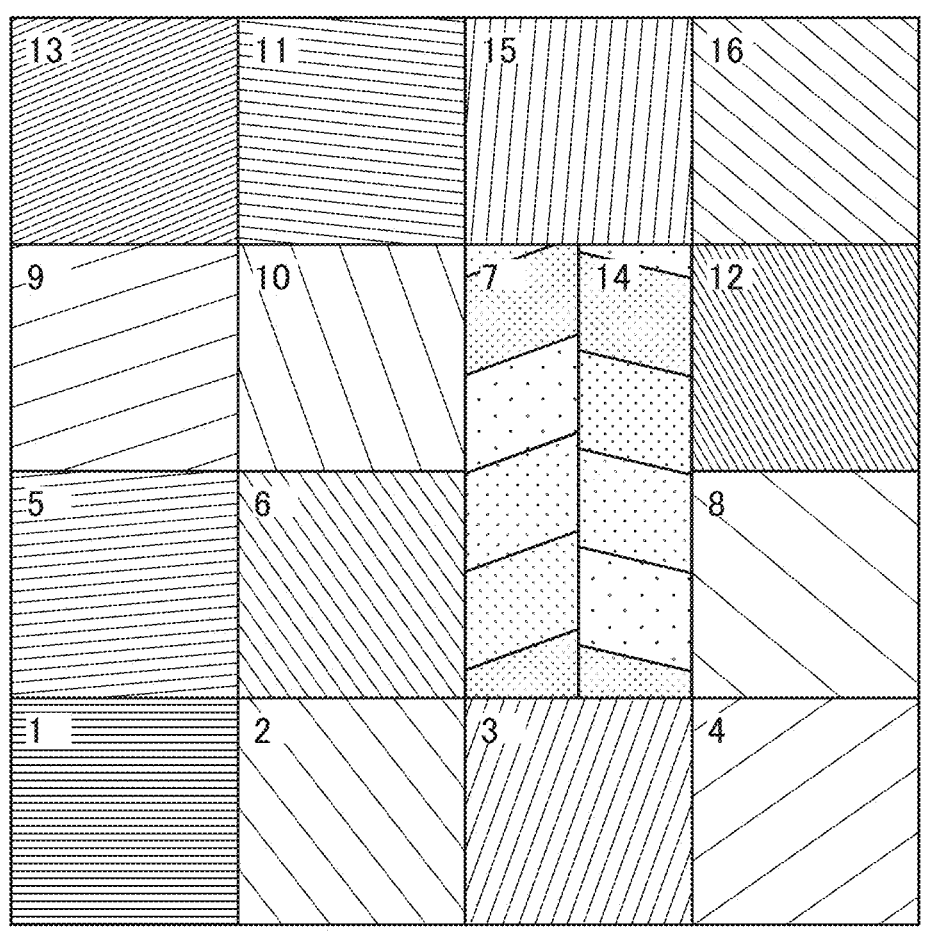
FIG. 7 is a diagram illustrating a state where two combined cells (cells of cell number 7 and 14) are divided into parts, the number of which corresponds to the number of combinations, from a combined state illustrated in FIG. 6 and respective diffraction gratings are rearranged.

FIG. 7 is a diagram illustrating a state where two combined cells (cells of cell number 7 and 14) are divided into parts, the number of which corresponds to the number of combinations, from a combined state illustrated in FIG. 6 and respective diffraction gratings are rearranged. Here, a direction in which the composite cells are divided corresponds to the left-right direction in the figure, which is a direction intersecting a direction in which two cells are arranged (specific direction: vertical direction in the figure). In this way, it possible to double the length of the composite cell in the specific direction (vertical direction in the figure) while making the area of one composite cell the same as the area of the basic cell. Then, the two newly created composite cells long in the vertical direction in the figure are newly allocated as cell numbers 4 and 14, respectively, and the same diffraction gratings as those of original cell numbers 4 and 14 are respectively arranged. In this way, in each of cell numbers 4 and 14 which are newly created composite cells, a diffraction grating having a long pitch can be configured to include one pitch. In addition, since the areas of the basic cell 10a and the composite cell 10b are the same, there is no change in the amount of light for which each cell is responsible.

As described above, according to the first embodiment, since the diffractive optical element 10 is provided with the composite cell 10b configured by combining and dividing a plurality of cells, it is possible to arrange a diffraction grating having a large pitch. In addition, since the size of the basic cell 10a can be made the same as that of a conventional one in the diffractive optical element 10, a large number of diffraction gratings can be arranged, and light shaping similar to conventional one can be performed.

Second Embodiment

Figure 8:
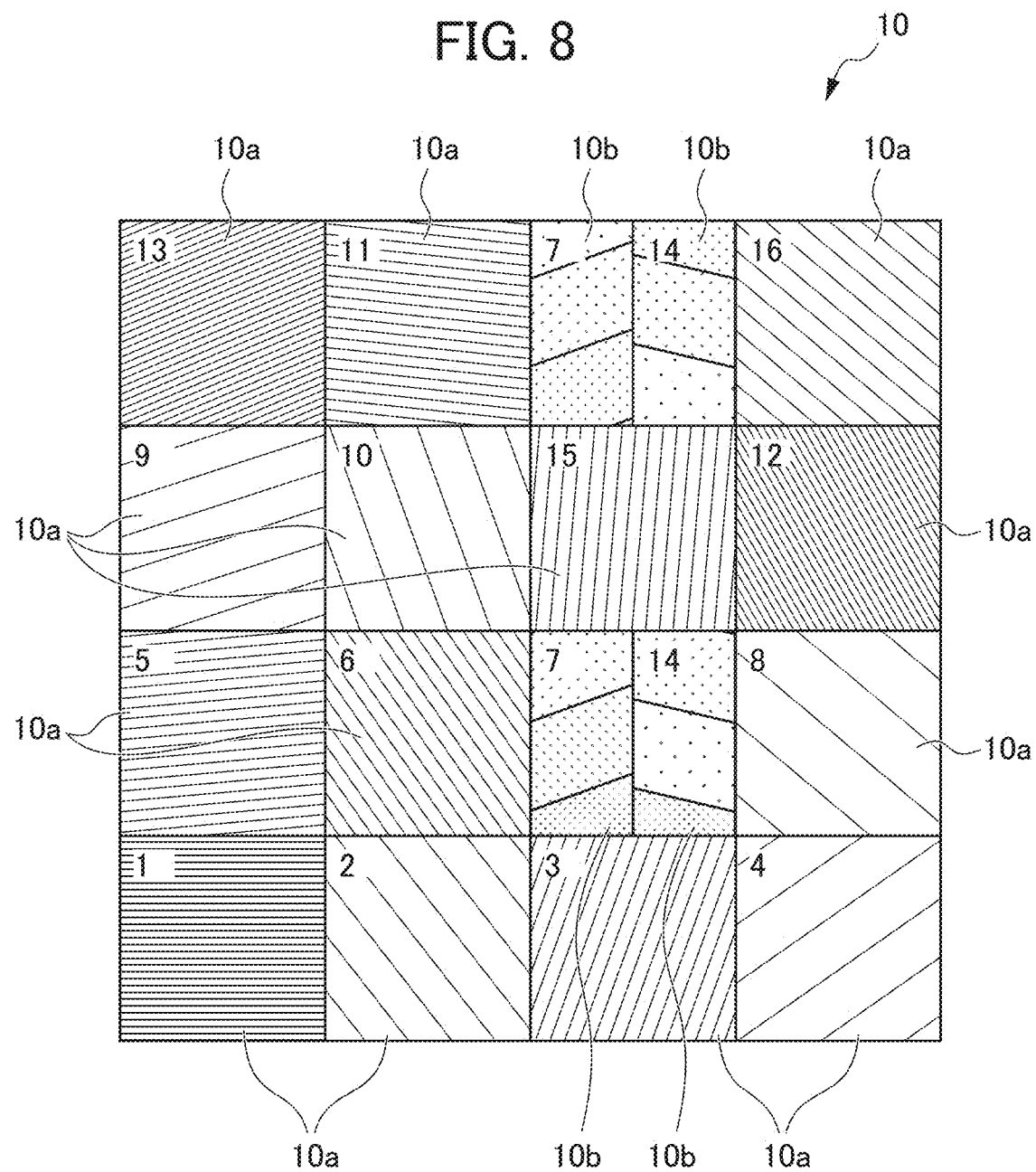
FIG. 8 is a plan view illustrating a second embodiment of a diffractive optical element according to the invention.

FIG. 8 is a plan view illustrating a second embodiment of a diffractive optical element according to the invention. The diffractive optical element 10 of the second embodiment has a similar configuration to that of the first embodiment except that the configuration of the composite cell 10b is different from that of the first embodiment. Therefore, the same reference symbol is attached to a portion having a similar function to that of the first embodiment described above, and a repeated description is appropriately omitted.

The diffractive optical element 10 of the second embodiment is different from that of the first embodiment in that the composite cell 10b is not configured as one connected cell and includes a plurality of cells arranged side by side at an interval. Further, the plurality of cells arranged side by side at an interval has the same pitch of the projections 11a and arrangement in the in-plane rotation direction and has a diffraction grating including one pitch of the projections 11a. In an example of FIG. 8, two composite cells 10b are arranged side by side at an interval with the basic cell 10a of cell number 15 interposed therebetween. In each of the respective cells of the composite cell 10b, that is, cells of cell number 7 arranged side by side at an interval and cells of cell number 14 arranged side by side at an interval, the same diffraction grating arranged at the same pitch and in the same rotation direction in a combination thereof is arranged. This will be more clearly described using FIG. 9.

Figure 9:
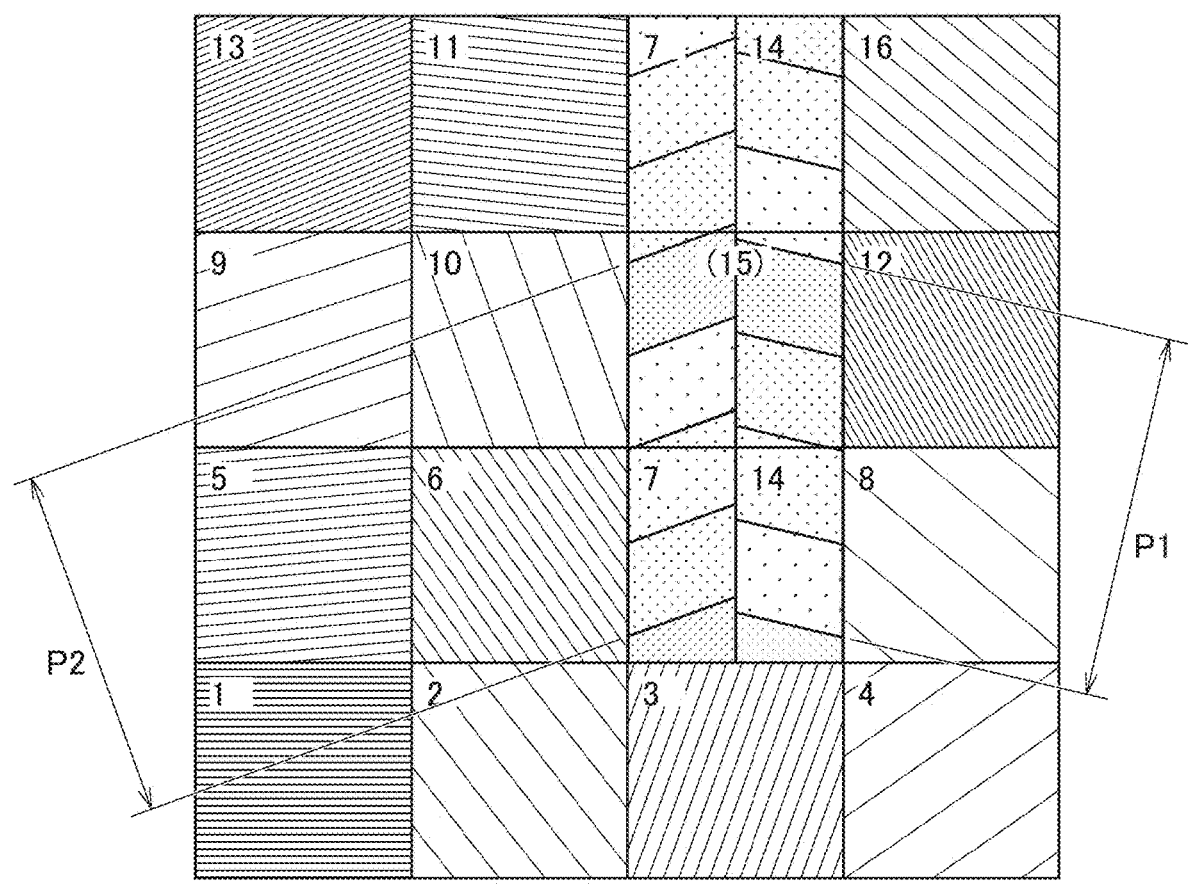
FIG. 9 is a diagram illustrating that a basic cell 10a of cell number 15 is removed from a state of FIG. 8 and the same diffraction grating as that of cell number 7 and cell number 14, which is not actually present, is tentatively arranged at a position of the basic cell.

FIG. 9 is a diagram illustrating that a basic cell 10a of cell number 15 is removed from a state of FIG. 8 and the same diffraction grating as that of cell number 7 and cell number 14, which is not actually present, is tentatively arranged at a position of the basic cell. In the diffractive optical element 10 of the second embodiment, the composite cells 10b are arranged not side by side but at an interval. Even though the diffraction gratings arranged at an interval has a form in which a space between the diffraction gratings is missing, there is a continuous relationship therebetween, that is, each of the diffraction gratings is included in a part of the same diffraction grating. Even when a middle part is missing as described above, if the diffraction gratings are included in the same diffraction grating as a whole, the diffraction gratings can exhibit desired performance as a diffraction grating. Therefore, the diffractive optical element 10 of the second embodiment can exhibit the same action and effect as those of the first embodiment.

Third Embodiment

Figure 10:
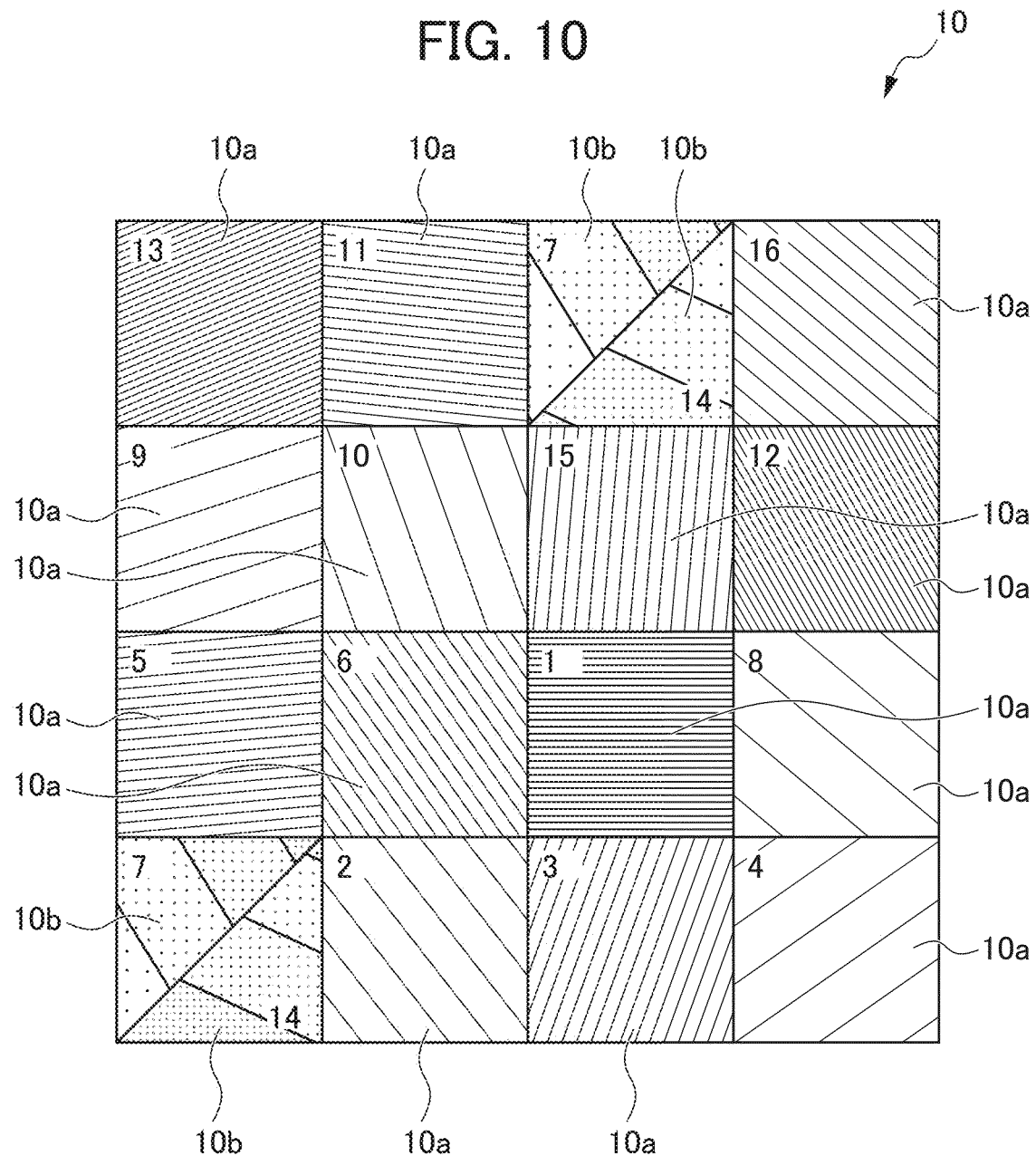
FIG. 10 is a plan view illustrating a third embodiment of a diffractive optical element according to the invention.

FIG. 10 is a plan view illustrating a third embodiment of a diffractive optical element according to the invention. The diffractive optical element 10 of the third embodiment has a similar configuration to that of the first embodiment except that the configuration of the composite cell 10b is different from that of the first embodiment. Therefore, the same reference symbol is attached to a portion having a similar function to that of the first embodiment described above, and a repeated description is appropriately omitted.

In the first embodiment and second embodiment described above, since the direction in which the projections 11a are arranged in the diffraction grating having a large pitch is close to an extending direction of the side of the basic cell 10a, the large pitch can be included by arranging square basic cells 10a in the vertical direction or the left-right direction in the figure at an interval. However, the rotation direction in the plane of the diffraction grating may not be appropriate. For example, the projections 11a may be arranged in a direction close to a diagonal direction of the basic cell 10a in many cases. There is a concern that such a case may not be dealt with merely by applying the first embodiment and the second embodiment described above. The third embodiment is an effective form, for example, when the projections 11a are arranged in the direction close to the diagonal direction of the basic cell 10a.

As illustrated in FIG. 10, in the third embodiment, the composite cells 10b are arranged at an interval in an oblique direction, that is, in a direction close to the diagonal direction of the basic cell 10a. Further, a direction of division of the composite cell 10b is set to the diagonal direction of the basic cell 10a. In this way, as illustrated in FIG. 10, even in the diffraction grating in which the projections 11a are arranged in the direction close to the diagonal direction of the basic cell 10a, one or more pitches thereof can be included in the entire composite cell 10b.

Figure 11:
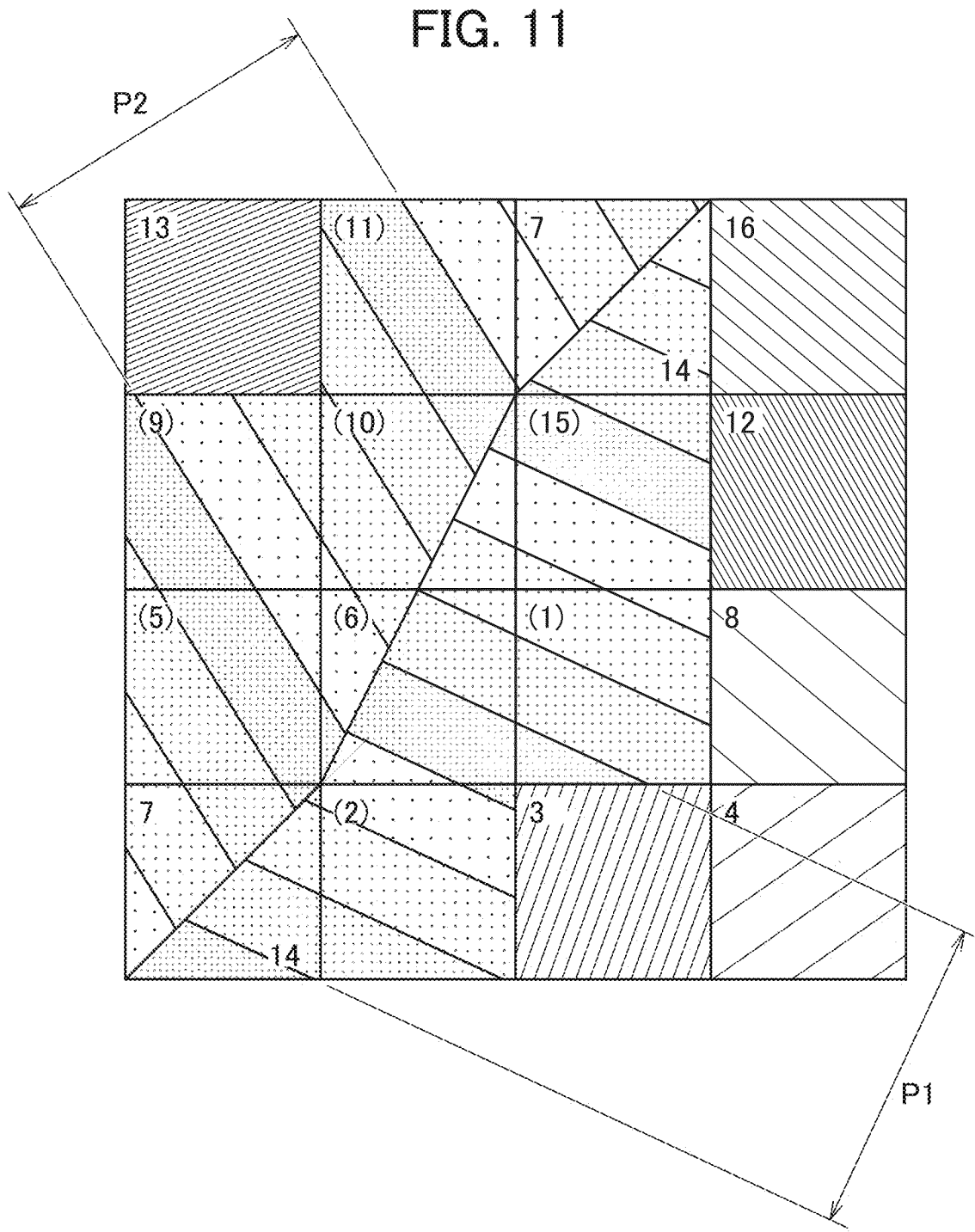
FIG. 11 is a diagram illustrating that basic cells 10a of cell numbers 1, 2, 5, 6, 9, 10, 11, and 15 are removed from a state of FIG. 10 and the same diffraction grating as that of cell number 7 and cell number 14, which is not actually present, is tentatively arranged at each of positions of the basic cells in the third embodiment similarly to FIG. 9 of the second embodiment.

FIG. 11 is a diagram illustrating that basic cells 10a of cell numbers 1, 2, 5, 6, 9, 10, 11, and 15 are removed from a state of FIG. 10 and the same diffraction grating as that of cell number 7 and cell number 14, which is not actually present, is tentatively arranged at each of positions of the basic cells in the third embodiment similarly to FIG. 9 of the second embodiment. As illustrated in FIG. 11, two cell numbers 7 are included in a part of the same diffraction grating. Similarly, two cell numbers 14 are included in a part of the same diffraction grating. Further, all the diffraction gratings represented by combining two composite cells include a diffraction grating of one pitch or more. Therefore, even in the oblique direction, the diffractive optical element 10 of the third embodiment can exhibit the same action and effect as those of the first embodiment and second embodiment.

Fourth Embodiment

Figure 12:
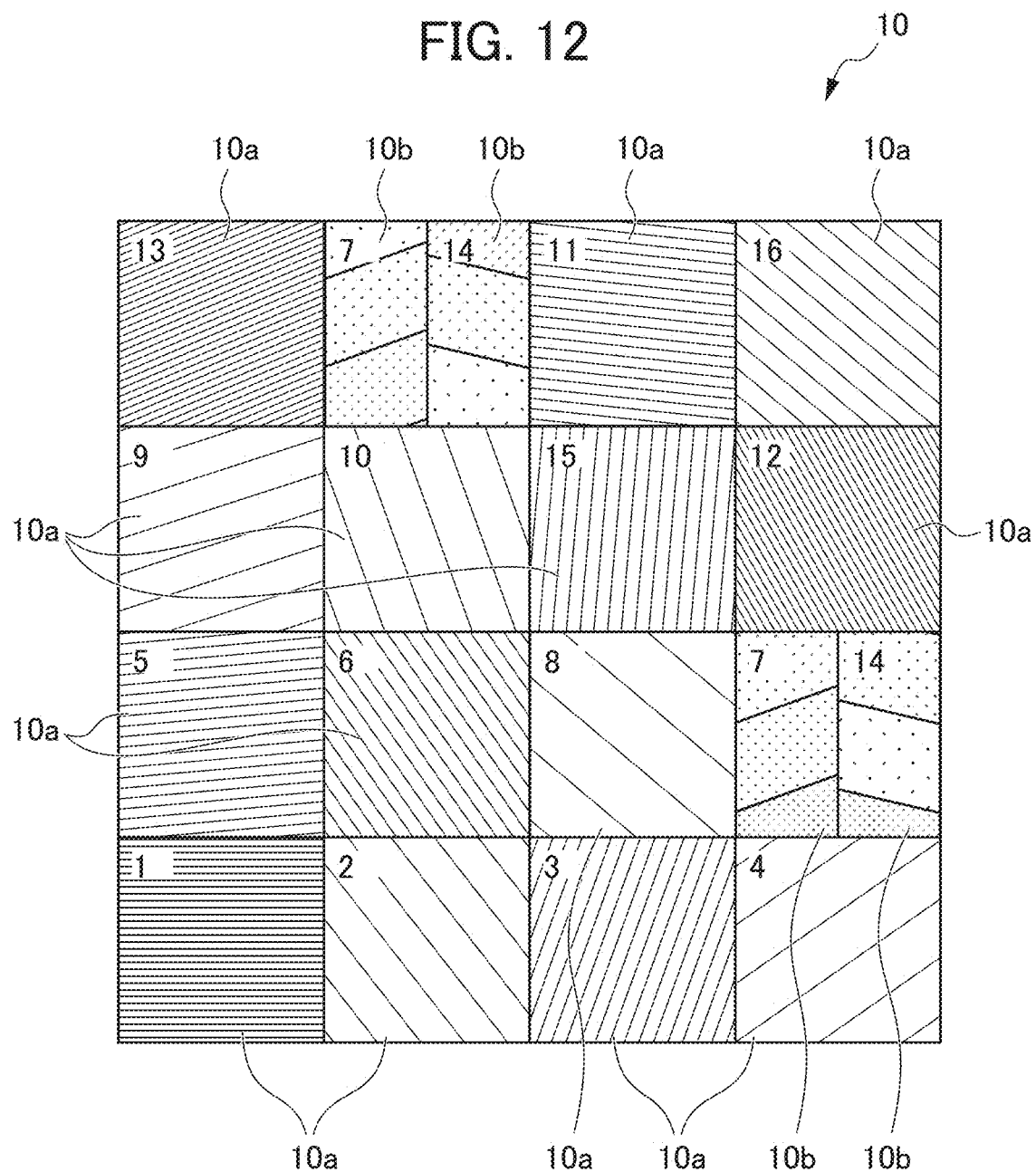
FIG. 12 is a plan view illustrating a fourth embodiment of a diffractive optical element according to the invention.

FIG. 12 is a plan view illustrating a fourth embodiment of a diffractive optical element according to the invention. The diffractive optical element 10 of the fourth embodiment has a similar configuration to that of the second embodiment except that the configuration of the composite cell 10b is different from that of the second embodiment. Therefore, the same reference symbol is attached to a portion having a similar function to that of the first embodiment and the second embodiment described above, and a repeated description is appropriately omitted.

The diffractive optical element 10 of the fourth embodiment corresponds to an example in which the composite cells 10b arranged at an interval in the vertical direction of the figure in the second embodiment are arranged at an interval in the left-right direction of the figure. When arrangement of the composite cells 10b as in the diffractive optical element 10 of the fourth embodiment is adopted, it is possible to achieve the same action and effect as those of the first embodiment and second embodiment.

(Verification)

Figure 13:
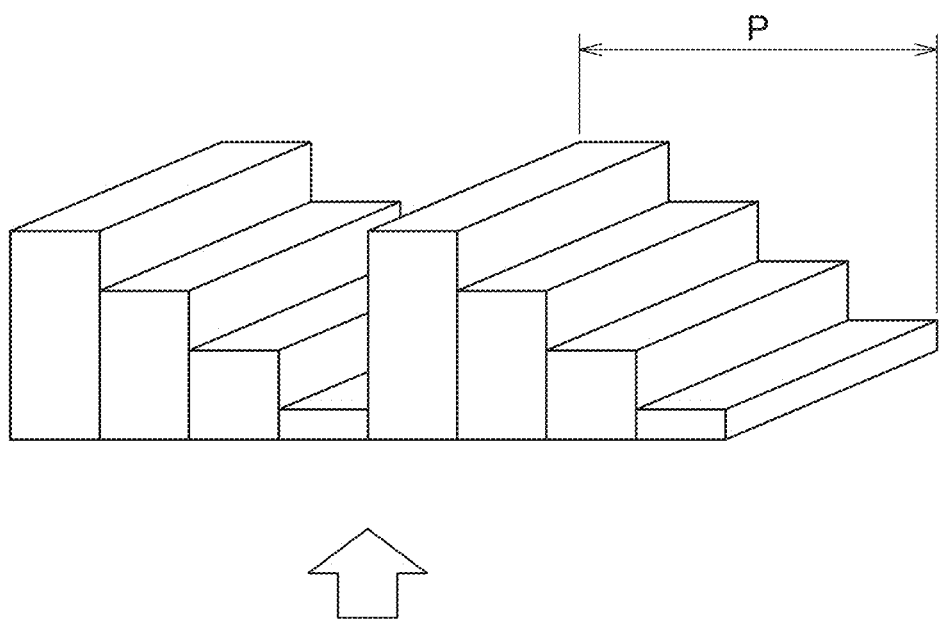
FIG. 13 is a diagram schematically illustrating a diffraction grating used for simulation.

A result of simulation corresponding to each of the above-described embodiments is shown below. FIG. 13 is a diagram schematically illustrating a diffraction grating used for simulation. The simulation is modeled on a 4-level diffraction grating in which P of FIG. 13 is set as one pitch.

Figure 14:
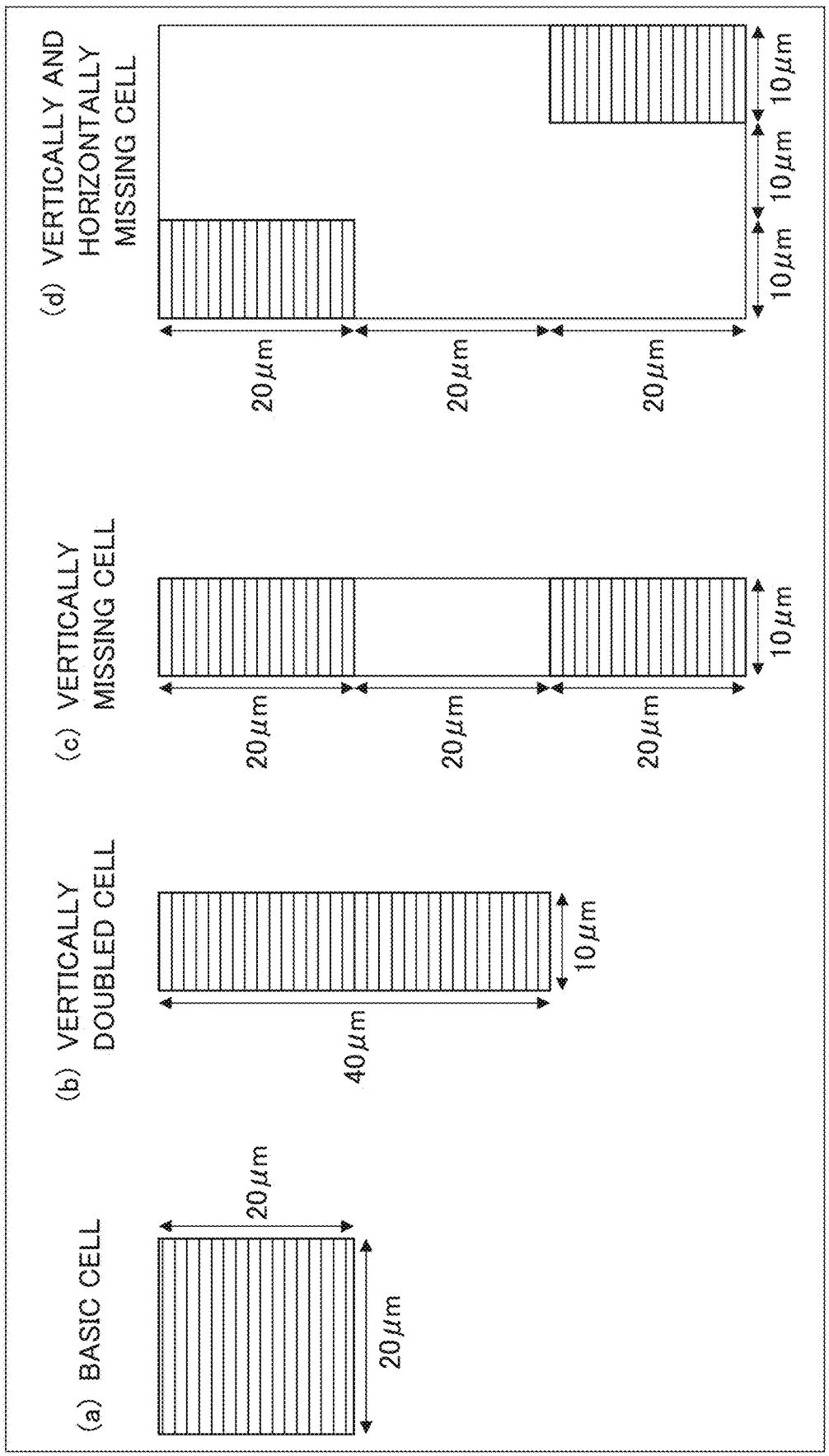
FIG. 14 is diagram illustrating arrangement patterns of a composite cell 10b undergoing simulation.
Figure 15:
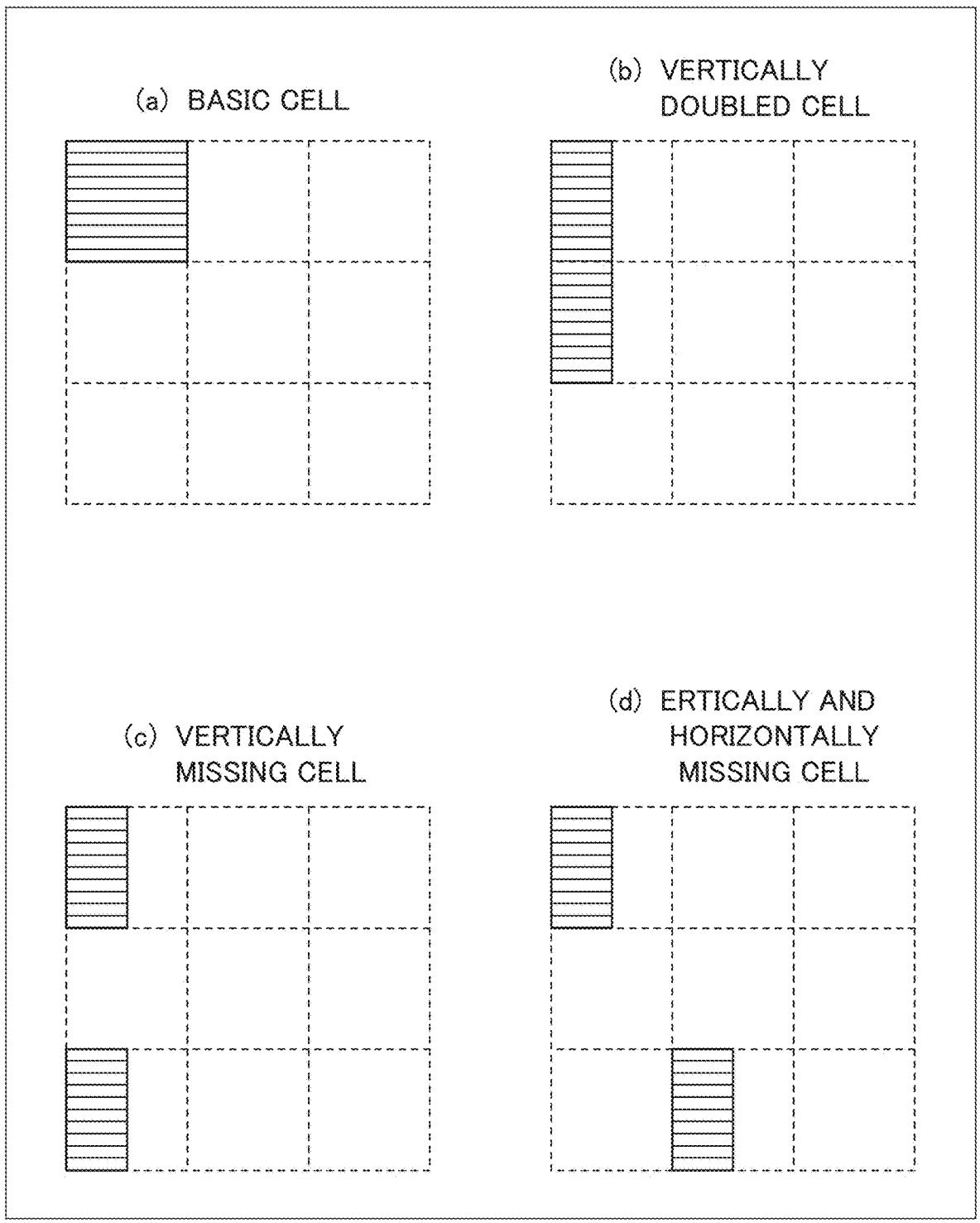
FIG. 15 is diagram illustrating the arrangement patterns of the composite cell 10b undergoing simulation together with a grid.

FIG. 14 is a diagram illustrating arrangement patterns of a composite cell 10b undergoing simulation. FIG. 15 is a diagram illustrating the arrangement patterns of the composite cell 10b undergoing simulation together with a grid. Simulation was performed using a form of FIG. 14(a) and FIG. 15(a) as a basic cell on composite cells 10b continuously arranged long in a longitudinal direction (direction coinciding with a direction in which steps of a diffraction grating are aligned) in the figure as in FIG. 14(b) and FIG. 15(b) (a form corresponding to the first embodiment, hereinafter, referred to as a vertically doubled cell), composite cells 10b spaced apart in the longitudinal direction (direction coinciding with a direction in which steps of a diffraction grating are aligned) in the figure as in FIG. 14(c) and FIG. 15(c) (a form corresponding to the second embodiment, hereinafter, referred to as a vertically missing cell), and composite cells 10b spaced apart in each of the longitudinal direction (direction coinciding with a direction in which steps of a diffraction grating are aligned) and the left-right direction (direction orthogonal to the direction in which steps of a diffraction grating are aligned) in the figure as in FIG. 14(d) and FIG. 15(d) (a form corresponding to the fourth embodiment, hereinafter, referred to as a vertically and horizontally missing cell).

Figure 16:
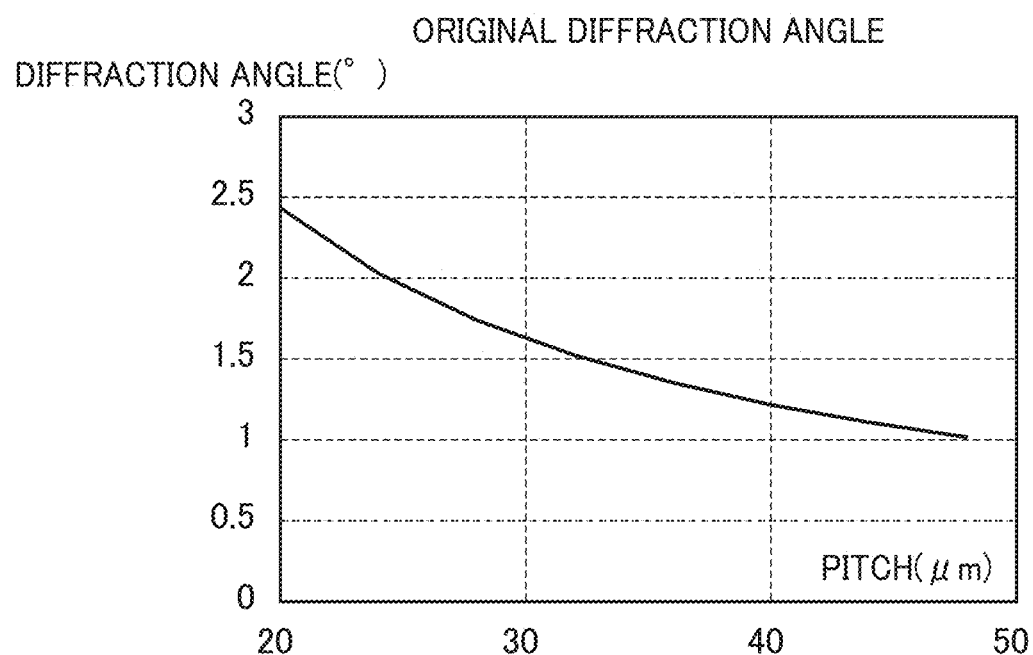
FIG. 16 is a diagram illustrating, in an ideal state, a change in diffraction angle with respect to a change in pitch in a basic cell.

FIG. 16 is a diagram illustrating, in an ideal state, a change in diffraction angle with respect to a change in pitch in a basic cell. The diffraction angle illustrated in FIG. 16 is an original diffraction angle, that is, a diffraction angle to be designed. Here, a Rsoft-BeamPROP simulator manufactured by Synopsys is used for simulation. This simulation is a simulation based on a beam propagation method, and the beam propagation method is described in, for example, "Numerical analysis of diffractive optical element and its application" Maruzen Publishing/Kashiko Kodate, supervision by Takeshi Kamiya.

In the grating cell array, a cell region is normally determined as in FIG. 14(a) in a 4-level grating of FIG. 13, and a direction of a diffraction angle is specified by a rotation direction and a pitch of the grating. Each grating cell has a pitch represented by pitch=wavelength÷sin(θ), where θ is a target diffraction angle. The pitch and the diffraction angle are illustrated in FIG. 16, which shows an ideal case where a grating period is sufficiently repeated.

Figure 17:
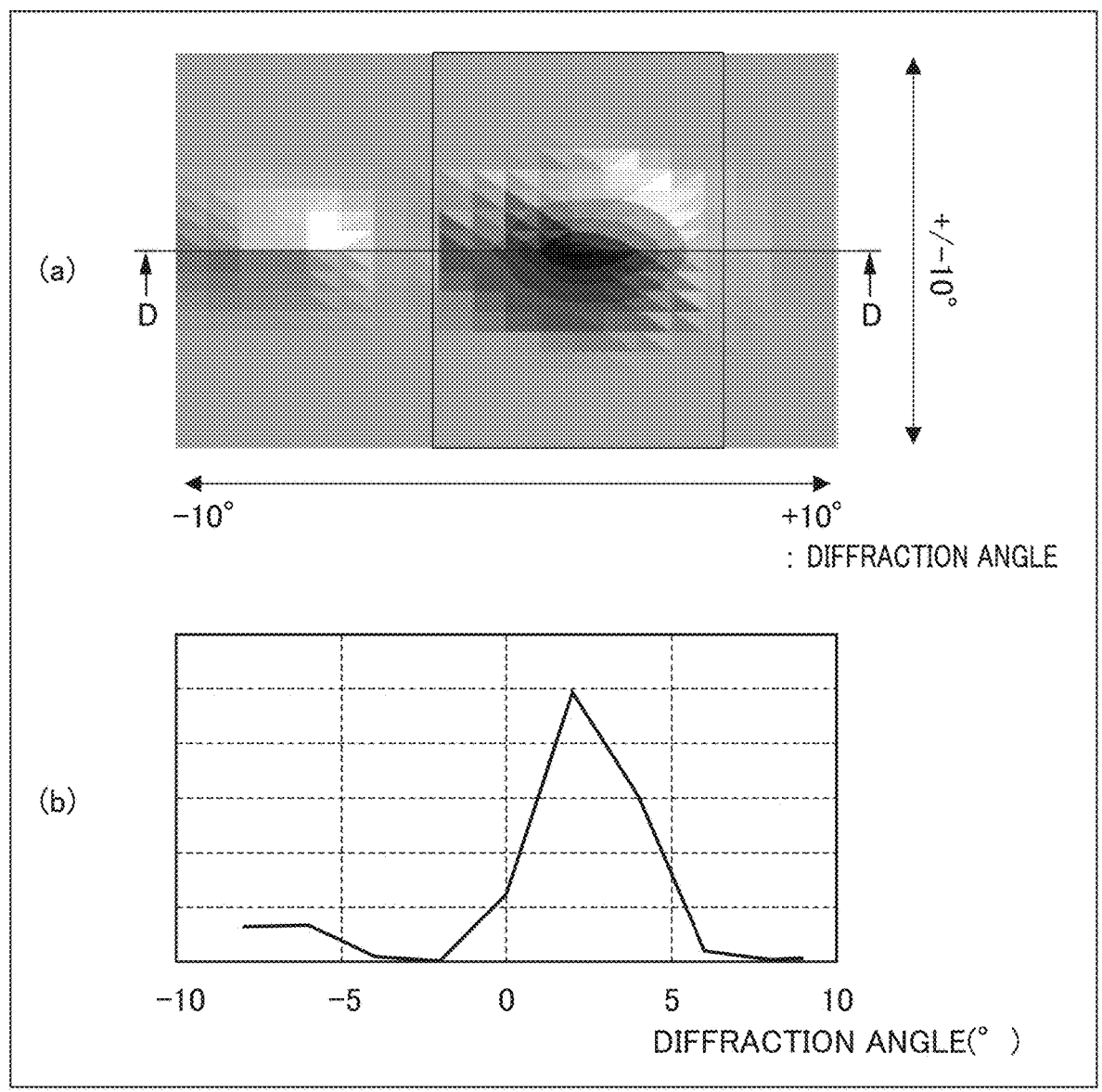
FIG. 17 is diagram illustrating a distribution of diffracted light emitted from a unit cell including a 20 μm pitch diffraction grating in a 20 μm square cell.

FIG. 17 is a diagram illustrating a distribution of diffracted light emitted from a unit cell including a 20 μm pitch diffraction grating in a 20 μm square cell. FIG. 17(a) is a diagram illustrating the distribution of diffracted light by shading, where a darker part is a part having a larger amount of light. FIG. 17(b) is a graph of a luminance distribution at a center position D-D of the distribution of FIG. 17(a). As described above, when the grating pitch increases, the number of pitch periods that can be represented by one cell is limited. For example, when one side of the square cell of FIG. 14(b) is 20 μm, the grating pitch of 20 μm corresponds to 1 period, and the grating pitch of 40 μm corresponds to 0.5 period. When the cell is a square whose one side is 20 μm and the grating pitch is 20 μm, diffracted light thereof is distributed as a surface near an original diffraction angle of 2.43° rather than a single diffraction angle illustrated in FIG. 17. Here, the center of gravity of the surface from x direction −1° to +5° of diffracted light distributed as a surface is taken as a diffraction angle.

Figure 18:
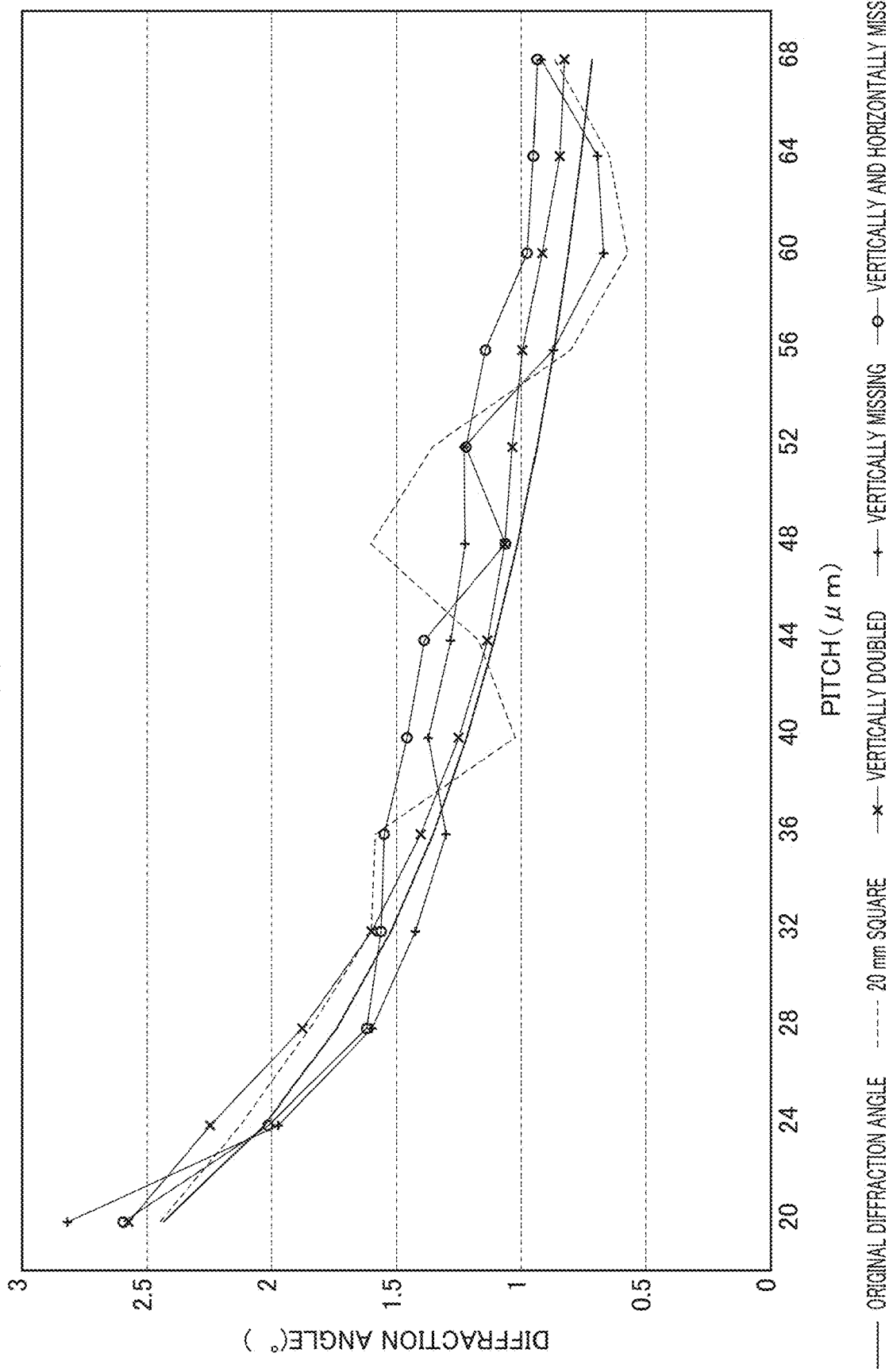
FIG. 18 is a diagram collectively illustrating simulation results.

FIG. 18 is a diagram collectively illustrating simulation results. In FIG. 18, an ideal diffraction angle with respect to a pitch and a diffraction angle obtained by the above-described center of gravity are illustrated together. It can be seen from FIG. 18 that in the case of a 20 mm square basic cell (FIG. 14(a)), the ideal diffraction angle deviates when the pitch is 40 μm. It can be understood that even though deviation from the ideal diffraction angle occurs in the vertically doubled cell (FIG. 14(b)), the vertically missing cell (FIG. 14(c)), and the vertically and horizontally missing cell (FIG. 14(d)) with respect to the 20 μm square cell, the amount of deviation thereof is small with respect to the amount of deviation of the 20 μm square cell (FIG. 14(a)).

(With Regard to Action of Composite Cell)

Figure 19A:
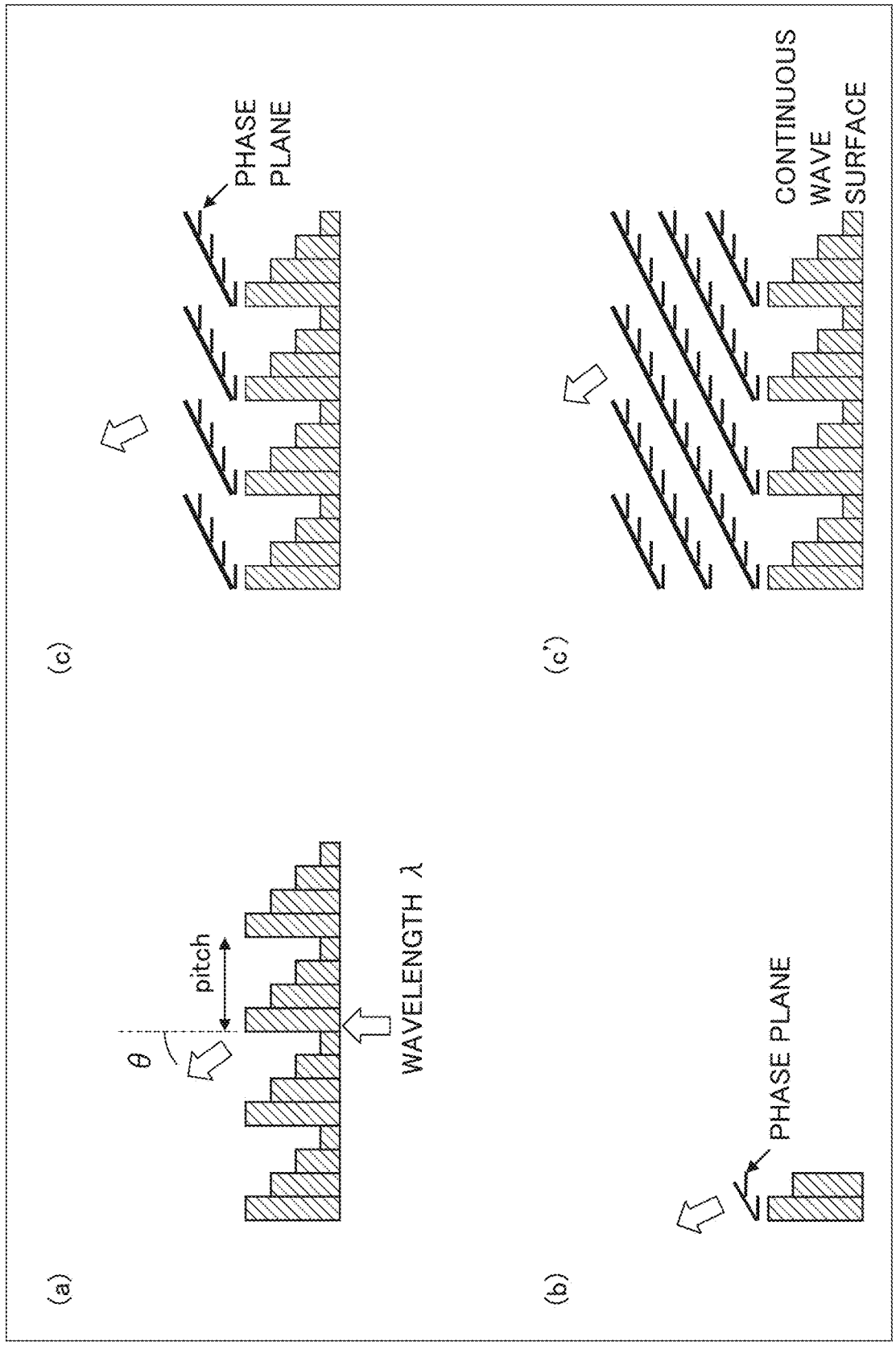
Figure 19B:
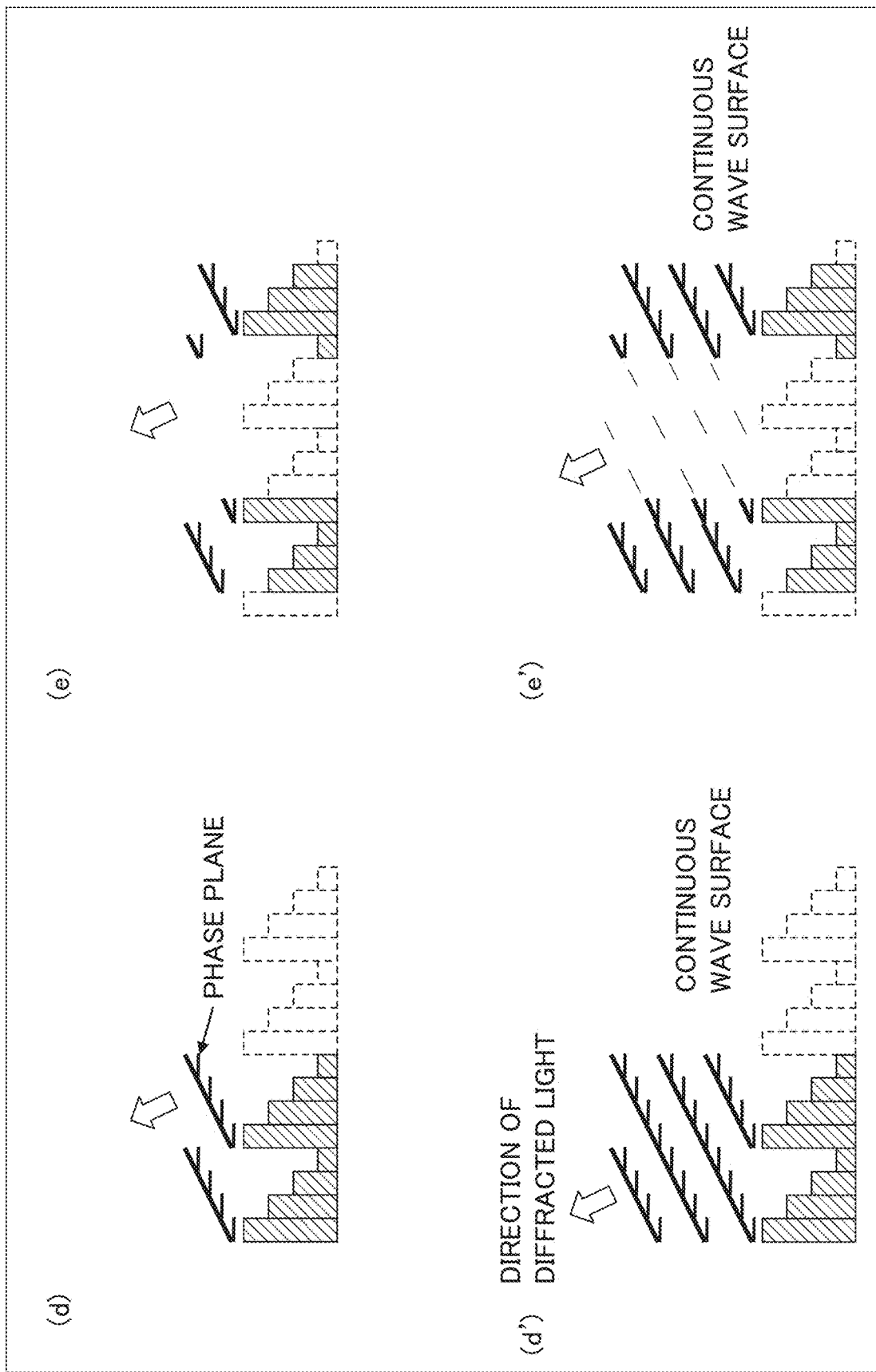

FIGS. 19A to 19C are diagrams for description of a diffraction phenomenon by a 4-level diffraction grating. Diffracted light has a diffraction angle defined by sin(diffraction angle θ)=wavelength λ/pitch as shown in FIG. 19A(a). The meaning of the diffracted light is that when incident light is set to a plane wave as illustrated in FIG. 19A(b) and passes through a medium of the diffraction grating, the speed of light is reduced by (1/refractive index), and thus a phase plane appearing thereon has a step shape and can be approximated to a plane of a diffraction angle. FIG. 19A(c') corresponds to the case of continuously entering a wave surface, and it is possible to form a wave surface of oblique light having a diffraction angle. FIG. 19B(d) illustrates a partial diffraction grating of FIG. 19C, and it can be understood that even though a range of the phase plane becomes narrow, the same continuous wave surface as that of FIG. 19A(c') is generated as illustrated in FIG. 19B(d'). FIG. 19B(e) illustrates a case where transmission of light does not occur in the middle in a continuous diffraction grating, and it can be understood that a wave surface is aligned as illustrated in FIG. 19B(e') when a continuous wave surface is irradiated. FIG. 19C(f) illustrates a case where a portion through which light does not pass is formed in the middle in a discontinuous diffraction grating. In this case, when a continuous wave surface is irradiated, as illustrated in FIG. 19C(f'), continuity between a wave surface of a portion a and a wave surface of a portion b is not obtained, and diffracted light is not obtained. As described above, theoretically, it is possible to describe usefulness of the composite cell of each embodiment described above.

(Modifications)

Various modifications and changes can be made without being limited to the embodiments described above, which are also within the scope of the invention.

(1) In each embodiment, an example of combining and dividing two cells to configure a composite cell has been described as the composite cell 10b. The invention is not limited thereto. For example, three or more cells may be combined and divided to configure a composite cell. As the number of combined cells increases, a length in the specific direction can be increased, and it is possible to arrange a diffraction grating having a longer pitch.

(2) In each embodiment, a shape of the composite cell is set to be easily understood and formed to be a rectangle or a right-angled isosceles triangle. However, these shapes may be appropriately changed to, for example, a trapezoid.

(3) In each embodiment, a 4-level diffraction grating has been described as an example. The invention is not limited thereto. For example, 2-level or 16-level may be adopted, and there is no restriction on the number of levels.

(4) In each embodiment, visible light has been exemplified as a wavelength of a diffraction target. However, the invention is not limited thereto. For example, light of the diffraction target may correspond to infrared light or ultraviolet light. In addition, the light source may correspond to an LED or a laser.

(5) In each embodiment, the basic cell 10a has been described by giving an example of being square. However, the invention is not limited thereto. For example, the shape of the basic cell may be a rectangle, or may be a polygon such as a triangle or a hexagon.

The first to third embodiments and the modifications can be used in combination as appropriate, and a detailed description is omitted. Further, the invention is not limited by the embodiments described above.

EXPLANATION OF REFERENCE NUMERALS

10 DIFFRACTIVE OPTICAL ELEMENT
10a BASIC CELL
10b COMPOSITE CELL
11 HIGH REFRACTIVE INDEX PART
11a PROJECTION
11a-1 LEVEL 1 STEP PORTION
11a-2 LEVEL 2 STEP PORTION
11a-3 LEVEL 3 STEP PORTION
11a-4 LEVEL 4 STEP PORTION
11b SIDEWALL PORTION
12 RECESS
13 SPACE
14 LOW REFRACTIVE INDEX PART
15 DIFFRACTION LAYER
200 SCREEN
201 LIGHT
202 IRRADIATION REGION
204 IRRADIATION REGION
210 LIGHT SOURCE UNIT

The invention claimed is:

1. A diffractive optical element comprising a diffraction layer, the diffraction layer including
a high refractive index part in which a plurality of projections is arranged side by side in a cross-sectional shape, and
a low refractive index part that has a lower refractive index than a refractive index of the high refractive index part and includes at least a recess formed between the projections,
a plurality of cells being arranged side by side, at least one of (a) a pitch at which the projections are arranged and (b) arrangement in an in-plane rotation direction being different for each cell, the pitch of the projections and the arrangement in the in-plane rotation direction being the same in the same cell, light being shaped by the plurality of cells,
wherein the plurality of cells includes
a plurality of basic cells having the same outer shapes, and
a composite cell having
a different outer shape from the basic cells and having a diffraction grating that has a length in a specific direction longer than a length of the basic cells, the length in the specific direction including at least one pitch of the projections, or
one diffraction grating in two of the plurality of cells separated by an interval, a pitch of the projections of the one diffraction grating and an arrangement in the in-plane rotation direction of the one diffraction grating being the same in the two of the plurality of cells, and the two of the plurality of cells together include one pitch of the projections
wherein the composite cell has a shape obtained by combining a specific number of basic cells and dividing the combined basic cells into parts equal in number to the specific number.

2. The diffractive optical element according to claim 1, wherein the composite cell is the two of the plurality of cells separated by the interval, a shape of the projections of the composite cell is virtually continuous at a position corresponding to an interval portion, and a spatial period of the two of the plurality of cells is the same.

3. The diffractive optical element according to claim 1, wherein a direction in which the composite cell is divided intersects the specific direction or intersects a direction in which a plurality of the composite cell is arranged at an interval.

4. The diffractive optical element according to claim 1, wherein a pitch of the projections of the diffraction grating included in the composite cell is larger than a pitch of projections of a diffraction grating included in the basic cells.

5. The diffractive optical element according to claim 4, wherein the pitch of the projections of the diffraction grating included in the composite cell is larger than a maximum length of the outer shapes of the basic cells.

6. A diffractive optical element comprising a diffraction layer, the diffraction layer including a high refractive index part in which a plurality of projections is arranged side by side in a cross-sectional shape, and a low refractive index part that has a lower refractive index than a refractive index of the high refractive index part and includes at least a recess formed between the projections, a plurality of cells being arranged side by side, at least one of (a) a pitch at which the projections are arranged and (b) arrangement in an in-plane rotation direction being different for each cell, the pitch of the projections and the arrangement in the in-plane rotation direction being the same in the same cell, light being shaped by the plurality of cells, wherein the plurality of cells includes a plurality of basic cells having the same outer shapes, and a composite cell having a different outer shape from the basic cells and having a diffraction grating that has a length in a specific direction longer than a length of the basic cells, the length in the specific direction including at least one pitch of the projections, or one diffraction grating in two of the plurality of cells separated by an interval, a pitch of the projections of the one diffraction grating and an arrangement in the in-plane rotation direction of the one diffraction grating being the same in the two of the plurality of cells, and the two of the plurality of cells together include one pitch of the projections, wherein a pitch of the projections of the diffraction grating included in the composite cell is larger than a pitch of projections of a diffraction grating included in the basic cells, and the pitch of the projections of the diffraction grating included in the composite cell is larger than a maximum length of the outer shapes of the basic cells.

* * * * *